(12) United States Patent
Zhou et al.

(10) Patent No.: US 8,411,931 B2
(45) Date of Patent: Apr. 2, 2013

(54) METHODS AND SYSTEMS FOR CONVERTING 2D MOTION PICTURES FOR STEREOSCOPIC 3D EXHIBITION

(75) Inventors: Samuel Zhou, Mississauga (CA); Paul Judkins, Toronto (CA); Ping Ye, Mississauga (CA)

(73) Assignee: IMAX Corporation, Mississauga, ON (CA)

(*) Notice: Subject to any disclaimer, the term of this patent is extended or adjusted under 35 U.S.C. 154(b) by 1116 days.

(21) Appl. No.: 12/299,909

(22) PCT Filed: Jun. 25, 2007

(86) PCT No.: PCT/IB2007/001726
§ 371 (c)(1),
(2), (4) Date: Jan. 13, 2009

(87) PCT Pub. No.: WO2007/148219
PCT Pub. Date: Dec. 27, 2007

(65) Prior Publication Data
US 2009/0116732 A1    May 7, 2009

Related U.S. Application Data

(60) Provisional application No. 60/816,272, filed on Jun. 23, 2006.

(51) Int. Cl.
*G06K 9/00* (2006.01)
*H04N 7/12* (2006.01)
(52) U.S. Cl. .................................. 382/154; 375/240.16
(58) Field of Classification Search .................. 382/100, 382/107, 154, 232, 236, 103, 168–172; 348/42, 348/45, 46, 47, 48, 65, 66, 79, 80; 375/240.21, 375/240.29, 240.16, 240.02, 240.25, 240.26
See application file for complete search history.

(56) References Cited

U.S. PATENT DOCUMENTS 3,740,115 A    6/1973 Cole
(Continued)

FOREIGN PATENT DOCUMENTS

CA    2279797    2/2001
CA    2 430 591 A1    6/2002
(Continued)

OTHER PUBLICATIONS

European Patent Application No. 07789439.2, Article 94(3) EPC Communication mailed Mar. 30, 2012 (5 pages).
(Continued)

*Primary Examiner* — Andrae S Allison
(74) *Attorney, Agent, or Firm* — Kilpatrick Townsend & Stockton LLP

(57) ABSTRACT

The present invention discloses methods of digitally converting 2D motion pictures or any other 2D image sequences to stereoscopic 3D image data for 3D exhibition. In one embodiment, various types of image data cues can be collected from 2D source images by various methods and then used for producing two distinct stereoscopic 3D views. Embodiments of the disclosed methods can be implemented within a highly efficient system comprising both software and computing hardware. The architectural model of some embodiments of the system is equally applicable to a wide range of conversion, re-mastering and visual enhancement applications for motion pictures and other image sequences, including converting a 2D motion picture or a 2D image sequence to 3D, re-mastering a motion picture or a video sequence to a different frame rate, enhancing the quality of a motion picture or other image sequences, or other conversions that facilitate further improvement in visual image quality within a projector to produce the enhanced images.

40 Claims, 15 Drawing Sheets

U.S. PATENT DOCUMENTS

| | | | |
|---|---|---|---|
| 4,141,624 A | 2/1979 | Siegmund | |
| 4,154,502 A | 5/1979 | Siegmund | |
| 4,359,759 A | 11/1982 | McBride et al. | |
| 4,378,952 A | 4/1983 | Siegmund | |
| 4,570,308 A | 2/1986 | Weisgerber | |
| 4,677,483 A | 6/1987 | Dischert et al. | |
| 4,794,714 A | 1/1989 | Weisgerber | |
| 4,889,423 A | 12/1989 | Trumbull | |
| 4,925,294 A | 5/1990 | Geshwind et al. | |
| 5,096,286 A | 3/1992 | Weisgerber | |
| 5,121,977 A | 6/1992 | Weisgerber | |
| 5,236,302 A | 8/1993 | Weisgerber et al. | |
| 5,259,040 A | 11/1993 | Hanna | |
| 5,288,210 A | 2/1994 | Albrecht et al. | |
| 5,325,449 A | 6/1994 | Burt et al. | |
| 5,338,154 A | 8/1994 | Meade et al. | |
| 5,379,369 A | 1/1995 | Komma et al. | |
| 5,472,313 A | 12/1995 | Quinones et al. | |
| 5,488,674 A | 1/1996 | Burt et al. | |
| 5,510,832 A | 4/1996 | Garcia | |
| 5,541,660 A | 7/1996 | Kim et al. | |
| 5,589,852 A | 12/1996 | Thompson et al. | |
| 5,600,731 A | 2/1997 | Sezan et al. | |
| 5,627,614 A | 5/1997 | Weisgerber | |
| 5,629,988 A | 5/1997 | Burt et al. | |
| 5,649,032 A | 7/1997 | Burt et al. | |
| 5,682,437 A | 10/1997 | Okino et al. | |
| 5,694,491 A | 12/1997 | Brill et al. | |
| 5,719,966 A | 2/1998 | Brill et al. | |
| 5,738,430 A | 4/1998 | Brill | |
| 5,739,844 A | 4/1998 | Kuwano et al. | |
| 5,739,894 A | 4/1998 | Weisgerber | |
| 5,745,213 A | 4/1998 | Goodhill et al. | |
| 5,748,199 A | 5/1998 | Palm | |
| 5,790,686 A | 8/1998 | Koc et al. | |
| 5,812,245 A | 9/1998 | Goodhill et al. | |
| 5,835,627 A | 11/1998 | Higgins et al. | |
| 5,841,512 A | 11/1998 | Goodhill | |
| 5,864,366 A | 1/1999 | Yeo | |
| 5,909,516 A | 6/1999 | Lubin | |
| 5,946,041 A | 8/1999 | Morita | |
| 5,946,076 A | 8/1999 | Goodhill et al. | |
| 5,963,664 A | 10/1999 | Kumar et al. | |
| 5,974,159 A | 10/1999 | Lubin et al. | |
| 5,978,029 A | 11/1999 | Boice et al. | |
| 5,999,220 A | 12/1999 | Washino | |
| 6,019,473 A | 2/2000 | Goodhill et al. | |
| 6,031,564 A | 2/2000 | Ma et al. | |
| 6,061,477 A | 5/2000 | Lohmeyer et al. | |
| 6,067,125 A | 5/2000 | May | |
| 6,072,907 A | 6/2000 | Taylor et al. | |
| 6,075,884 A | 6/2000 | Lubin et al. | |
| 6,108,005 A | 8/2000 | Starks et al. | |
| 6,130,660 A | 10/2000 | Imsand | |
| 6,130,717 A | 10/2000 | Arai et al. | |
| 6,137,904 A | 10/2000 | Lubin et al. | |
| 6,141,459 A | 10/2000 | Gendel | |
| 6,191,809 B1 | 2/2001 | Hori et al. | |
| 6,208,348 B1 | 3/2001 | Kaye | |
| 6,215,516 B1 | 4/2001 | Ma et al. | |
| 6,219,462 B1 | 4/2001 | Anandan et al. | |
| 6,229,570 B1 | 5/2001 | Bugwadia et al. | |
| 6,243,156 B1 | 6/2001 | Weisgerber | |
| 6,266,092 B1 | 7/2001 | Wang et al. | |
| 6,269,175 B1 | 7/2001 | Hanna et al. | |
| 6,298,090 B1 | 10/2001 | Challapali et al. | |
| 6,326,999 B1 | 12/2001 | Wise | |
| 6,351,545 B1 | 2/2002 | Edelson et al. | |
| 6,370,198 B1 | 4/2002 | Washino | |
| 6,442,203 B1 | 8/2002 | Demos | |
| 6,450,644 B1 | 9/2002 | Goodhill et al. | |
| 6,477,267 B1 | 11/2002 | Richards | |
| 6,487,304 B1 | 11/2002 | Szeliski | |
| 6,496,598 B1 * | 12/2002 | Harman | 382/154 |
| 6,515,659 B1 | 2/2003 | Best et al. | |
| 6,522,787 B1 | 2/2003 | Kumar et al. | |
| 6,549,240 B1 | 4/2003 | Reitmeier | |
| 6,560,281 B1 | 5/2003 | Black et al. | |
| 6,573,912 B1 | 6/2003 | Suzuki et al. | |
| 6,590,573 B1 | 7/2003 | Geshwind | |
| 6,618,439 B1 | 9/2003 | Kuo et al. | |
| 6,625,333 B1 | 9/2003 | Wang et al. | |
| 6,686,926 B1 | 2/2004 | Kaye | |
| 6,728,317 B1 | 4/2004 | Demos | |
| 6,806,898 B1 | 10/2004 | Toyama et al. | |
| 6,856,314 B2 | 2/2005 | Ng | |
| 6,900,846 B2 | 5/2005 | Lee et al. | |
| 6,950,462 B2 | 9/2005 | Watabe et al. | |
| 6,968,006 B1 | 11/2005 | Puri et al. | |
| 6,992,700 B1 | 1/2006 | Sato et al. | |
| 7,006,157 B2 | 2/2006 | Sohn | |
| 7,079,697 B2 | 7/2006 | Zhou | |
| 7,119,837 B2 | 10/2006 | Soupliotis et al. | |
| 7,227,125 B2 | 6/2007 | Sannomiya et al. | |
| 7,227,896 B2 | 6/2007 | Sun | |
| 7,254,265 B2 * | 8/2007 | Naske et al. | 382/154 |
| 7,260,274 B2 | 8/2007 | Sawhney et al. | |
| 7,689,031 B2 * | 3/2010 | Berretty et al. | 382/154 |
| 7,856,055 B2 | 12/2010 | Zhou et al. | |
| 2001/0031003 A1 | 10/2001 | Sawhney et al. | |
| 2001/0043310 A1 | 11/2001 | Goodhill et al. | |
| 2002/0021412 A1 | 2/2002 | Goodhill et al. | |
| 2002/0035432 A1 | 3/2002 | Kubica et al. | |
| 2002/0136293 A1 | 9/2002 | Washino | |
| 2002/0149696 A1 | 10/2002 | Cok et al. | |
| 2003/0011746 A1 | 1/2003 | Goodhill et al. | |
| 2003/0016750 A1 | 1/2003 | Cok | |
| 2003/0036974 A1 | 2/2003 | Allen | |
| 2003/0043344 A1 | 3/2003 | Goodhill et al. | |
| 2003/0048419 A1 | 3/2003 | Goodhill et al. | |
| 2003/0050940 A1 | 3/2003 | Robinson | |
| 2003/0095704 A1 | 5/2003 | Risson | |
| 2003/0128871 A1 * | 7/2003 | Naske et al. | 382/154 |
| 2003/0169404 A1 | 9/2003 | Weisgerber | |
| 2003/0204384 A1 | 10/2003 | Owechko et al. | |
| 2004/0017510 A1 | 1/2004 | Honda et al. | |
| 2004/0022318 A1 | 2/2004 | Garrido et al. | |
| 2004/0046891 A1 | 3/2004 | Mishima et al. | |
| 2004/0057015 A1 | 3/2004 | Goodhill et al. | |
| 2004/0066491 A1 | 4/2004 | Goodhill et al. | |
| 2004/0130680 A1 | 7/2004 | Zhou et al. | |
| 2004/0136686 A1 | 7/2004 | Kono et al. | |
| 2004/0201777 A1 | 10/2004 | Zhu et al. | |
| 2004/0202445 A1 | 10/2004 | DiFrancesco | |
| 2004/0223640 A1 | 11/2004 | Bovyrin | |
| 2004/0227851 A1 | 11/2004 | Min et al. | |
| 2004/0236807 A1 | 11/2004 | Hsiung et al. | |
| 2004/0246374 A1 | 12/2004 | Mishima et al. | |
| 2004/0252230 A1 | 12/2004 | Winder et al. | |
| 2004/0252759 A1 | 12/2004 | Winder et al. | |
| 2005/0002456 A1 | 1/2005 | Min et al. | |
| 2005/0024589 A1 | 2/2005 | Goodhill et al. | |
| 2005/0036113 A1 | 2/2005 | Goodhill et al. | |
| 2005/0053291 A1 | 3/2005 | Mishima et al. | |
| 2005/0105001 A1 | 5/2005 | Yui et al. | |
| 2005/0226529 A1 | 10/2005 | Kondo | |
| 2005/0254011 A1 | 11/2005 | Weisgerber | |
| 2005/0265451 A1 | 12/2005 | Shi et al. | |
| 2006/0120451 A1 | 6/2006 | Hannuksela | |
| 2006/0165179 A1 | 7/2006 | Feuer et al. | |
| 2007/0019883 A1 * | 1/2007 | Wong et al. | 382/276 |
| 2008/0055490 A1 | 3/2008 | Yasuda et al. | |
| 2009/0116732 A1 | 5/2009 | Zhou et al. | |
| 2010/0182406 A1 * | 7/2010 | Benitez | 348/46 |
| 2010/0231593 A1 | 9/2010 | Zhou | |
| 2011/0069152 A1 * | 3/2011 | Wang et al. | 348/43 |
| 2012/0056984 A1 * | 3/2012 | Zhang et al. | 348/43 |

FOREIGN PATENT DOCUMENTS

| | | |
|---|---|---|
| CN | 101375315 A | 2/2009 |
| CN | 101479765 A | 7/2009 |
| EP | 0037722 A1 | 10/1981 |
| EP | 0475499 A1 | 11/1995 |
| EP | 0742674 | 11/1996 |
| EP | 0595895 | 12/1997 |
| EP | 0879441 | 11/1998 |
| EP | 0920652 | 6/1999 |

| | | |
|---|---|---|
| EP | 0665697 | 5/2000 |
| EP | 1002257 | 5/2000 |
| EP | 0637889 A2 | 1/2001 |
| EP | 1084451 | 3/2001 |
| EP | 1164792 A2 | 12/2001 |
| EP | 0735512 | 6/2002 |
| EP | 1217839 A2 | 6/2002 |
| EP | 1234447 | 8/2002 |
| EP | 1235426 A2 | 8/2002 |
| EP | 1237370 A2 | 9/2002 |
| EP | 1247138 | 10/2002 |
| EP | 1 354 292 A1 | 10/2003 |
| EP | 1397003 A1 | 3/2004 |
| EP | 1455338 A1 | 9/2004 |
| EP | 1 483 909 A1 | 12/2004 |
| EP | 0837601 A2 | 12/2004 |
| EP | 1503582 A1 | 2/2005 |
| EP | 1519358 A2 | 3/2005 |
| EP | 1549054 A2 | 6/2005 |
| EP | 1571854 | 7/2005 |
| EP | 1583364 A1 | 10/2005 |
| EP | 1585326 A1 | 10/2005 |
| EP | 1 977 395 A1 | 10/2008 |
| EP | 2033164 | 3/2009 |
| EP | 2 160 037 A2 | 3/2010 |
| GB | 2009959 A | 6/1979 |
| GB | 2081923 A | 2/1982 |
| GB | 2162018 A | 1/1986 |
| GB | 2210237 A | 6/1989 |
| GB | 2215936 A | 9/1989 |
| GB | 2280080 A | 1/1995 |
| GB | 2343316 A | 5/2000 |
| IN | 283597 | 3/2003 |
| JP | 6102484 | 4/1994 |
| JP | 7311427 | 11/1995 |
| JP | 9281439 | 10/1997 |
| JP | 9319869 | 12/1997 |
| JP | 4201165 | 7/2004 |
| JP | 2004274219 | 9/2004 |
| JP | 2004297719 | 10/2004 |
| JP | 2004312669 | 11/2004 |
| JP | 2004343715 | 12/2004 |
| JP | 2004348117 | 12/2004 |
| JP | 2004357215 | 12/2004 |
| JP | 2005051389 | 2/2005 |
| JP | 2005057809 | 3/2005 |
| JP | 2005124167 | 5/2005 |
| JP | 2005204075 | 7/2005 |
| JP | 2005210697 | 8/2005 |
| JP | 2006-0102484 A | 10/2007 |
| WO | WO 93/02529 | 2/1993 |
| WO | WO 93/07585 | 4/1993 |
| WO | WO 93/23823 | 11/1993 |
| WO | WO 94/10675 | 5/1994 |
| WO | WO 96/15508 | 5/1996 |
| WO | WO 97/01135 | 1/1997 |
| WO | 9724000 | 7/1997 |
| WO | WO 97/24000 | 7/1997 |
| WO | WO 97/29401 | 8/1997 |
| WO | WO 97/37323 | 10/1997 |
| WO | WO 98/02844 | 1/1998 |
| WO | WO 98/08140 | 2/1998 |
| WO | WO 98/21690 | 5/1998 |
| WO | WO 98/52356 | 11/1998 |
| WO | WO 99/08155 | 2/1999 |
| WO | 9912127 | 3/1999 |
| WO | WO 99/12127 | 3/1999 |
| WO | WO 99/56175 | 11/1999 |
| WO | WO 00/13423 | 3/2000 |
| WO | WO 00/38434 | 6/2000 |
| WO | WO 01/28238 | 4/2001 |
| WO | WO 01/35657 | 5/2001 |
| WO | WO 01/51987 | 7/2001 |
| WO | WO 02/03687 | 1/2002 |
| WO | WO 02/12143 | 2/2002 |
| WO | WO 02/45003 | 6/2002 |
| WO | WO 03/077549 | 9/2003 |
| WO | WO 2005/109899 | 11/2005 |
| WO | WO 2007/085950 | 8/2007 |
| WO | WO 2007/148219 | 12/2007 |

OTHER PUBLICATIONS

Japanese Patent Application No. 03810057.6 , Decision Reversing Rejection of Application mailed Dec. 21, 2011 ( 35 pages).

European Application No. 01989802.2, European Search Report mailed on Mar. 23, 2009, 4 Pages.

European Application No. 01989802.2, Office Action mailed on Sep. 2, 2010, 4 Pages.

Chinese Application No. 03810057.6, Office Action mailed on Nov. 14, 2008, 6 Pages.

Chinese Application No. 03810057.6, Office Action mailed on Jun. 6, 2008, 11 Pages.

European Application No. 09153591.4, European Search Report mailed on Oct. 14, 2010, 8 Pages.

U.S. Appl. No. 10/433,338, Notice of Allowance mailed on May 4, 2007, 7 Pages.

U.S. Appl. No. 10/433,338, Office Action mailed Oct. 5, 2006, 11 Pages.

U.S. Appl. No. 10/474,780, Notice of Allowance mailed on Feb. 4, 2010, 13 Pages.

U.S. Appl. No. 10/474,780, Office Action mailed on Apr. 5, 2007, 15 Pages.

U.S. Appl. No. 10/474,780, Office Action mailed on Apr. 16, 2008, 17 Pages.

U.S. Appl. No. 10/474,780, Office Action mailed on Jan. 6, 2009, 18 Pages.

U.S. Appl. No. 10/474,780, Office Action mailed on Jun. 25, 2009, 17 Pages.

Indian Application No. 1303/KOLNP/2004, Office Action mailed on Sep. 26, 2006, 4 pages.

Canadian Application No. 2,430,591, Notice of Allowance mailed on Jan. 6, 2011, 1 Page.

Canadian Application No. 2,430,591, Office Action mailed on Apr. 12, 2010, 3 Pages.

Canadian Application No. 2,478,671, Office Action mailed on Dec. 6, 2007, 2 Pages.

Canadian Application No. 2,478,671, Office Action mailed on Apr. 29, 2009, 2 Pages.

Canadian Application No. 2,478,671, Office Action mailed on Jul. 20, 2010, 2 Pages.

Chinese Application No. 200780023673.7, Office Action mailed on Apr. 1, 2011, 3 Pages.

Ahmadi, et al., "Improved Algorithms for Phase Prediction and Frame Interpolation in Low Bit Rate Sinusoidal Coders", *Conference Record of Thirty-Second Asilomar Conference on Signals, Systems and Computers*, 1998, vol. 1, pp. 362-366.

Al-Mualla, et al., "Motion Field Interpolation for Frame Rate Conversion", *Proceedings of the IEEE International Symposium on Circuits and Systems*, 2003, vol. 2, pp. 652-655.

Bagnara, et al., "Frame Interpolation in Low Bit Rate Coding by 3D Motion Estimation", *Image and Multidimensional Digital Signal Processing*, 1998, pp. 127-130.

Bergen, et al., "Hierarchical model-based motion estimation", *In Proceedings 2nd European Conference on Computer vision*, 1992, pp. 237-252.

Biswas, et al., "A Novel Motion Estimation Algorithm Using Phase Plane Correlation for Frame Rate Conversion", *Conference Record of the Thirty-Sixth Asilomar Conference on Signals Systems and Computers*, 2002, vol. 1, pp. 492-496.

Castagno, et al., "A Method for Motion Adaptive Frame Rate Up-Conversion", *IEEE Transactions on Circuits and Systems for Video Technology*, Oct. 1996, vol. 6, No. 5, pp. 436-446.

Chen, et al., "A New Frame Interpolation Scheme for Talking Head Sequences", *Proceedings of International Conference on Image Processing*, 1995, vol. 2, pp. 591-594.

Dane, et al., "Encoder-Assisted Adaptive Video Frame Interpolation", *IEEE International Conference on Acoustics, Speech and Signal Processing*, 2005, vol. 2, pp. 349-352.

Dane, et al., "Motion Vector Processing for Frame Rate Up Conversion", *IEEE International Conference on Acoustics, Speech and Signal Processing*, 2004, vol. 3, pp. 309-312.

Ha, et al., "Motion Compensated Frame Interpolation by New Block-Based Motion Estimation Algorithm", *IEEE Transactions on Consumer Electronics*, May 2004, vol. 50, No. 2, pp. 752-759.

Ha, et al., "Motion Compensated Frame Rate Conversion by Overlapped Block-Based Motion Estimation Algorithm", *IEEE International Symposium on Consumer Electronics*, 2004, pp. 345-350.

Hilman, et al., "Using Motion-Compensated Frame-Rate Conversion for the Correction of 3:2 Pull down Artifacts in Video Sequences", *IEEE Transactions on Circuits and Systems for Video Technology*, Sep. 2000, vol. 10, No. 6, pp. 869-877.

Jeon, et al., "Coarse-To-Fine Frame Interpolation for Frame Up-Conversion Using Pyramid Structure", *IEEE Transactions on Consumer Electronics*, Aug. 2003, vol. 49, No. 3, pp. 499-508.

Karim, et al., "Low Rate Video Frame Interpolation—Challenges and Solutions", *IEEE International Conference on Acoustic, Speech and Signal Processing*, vol. 3, pp. 117-120.

Karim, et al., "Multiresolution Motion Estimation for Low-Rate Video Frame Interpolation", *EURASIP Journal on Applied Signal Processing*, 2004, No. 11, pp. 1708-1720.

Kim, et al., "A New Video Interpolation Technique Based on Motion-Adaptive Subsampling", *Digest of Technical Papers, International Conference on Consumer electronics*, 1999, pp. 370-371.

Kim, et al., "A New Video Interpolation Technique Based on Motion-Adaptive Subsampling", *IEEE Transactions on Consumer Electronics*, Aug. 1999, vol. 45, No. 3, pp. 782-787.

Krishnamurthy, et al., "Frame Interpolation and Bidirectional Prediction of Video Using Compactly encoded Optical-Flow fields and Label Fields", *IEEE Transactions on Circuits and Systems for Video Technology*, Aug. 1999, vol. 9, No. 5, pp. 713-726.

Kuo, et al., "Motion-Compensated Frame Interpolation Scheme for H.263 Codec", *Proceeding of the IEEE International Symposium on Circuits and Systems VLSI*, 1999, vol. 4, pp. 491-494.

Lagendijk, et al., "Motion Compensated Frame Rate Conversion of Motion Pictures", *IEEE International Conference on Acoustics, Speech and Signal Processing*, 1992, vol. 3, pp. 453-456.

Lee, et al., "Hierarchical Motion Compensated Frame Rate Up-Conversion Based on the Gaussian/Laplacian Pyramid", *Digest of Technical Papers, International Conference on Consumer Electronics*, 2003, pp. 350-351.

Liu, et al., "Frame Interpolation Scheme Using Inertia Motion Prediction", *Signal Processing: Image Communication*, Mar. 2003, vol. 18, No. 3, pp. 221-229.

Mishima, et al., "Novel Frame Interpolation Method for Hold-Type Displays", *International Conference on Image Processing*, 2004, vol. 3, pp. 1473-1476.

Sezan, et al., "Frame Rate Conversion of Motion Picture Films for Progressive-Scan HDTV", *Signal Processing VI—Theories and Applications, Sixth European Signal Processing Conference*, 1992, vol. 3, pp. 1279-1282.

Shin, et al., "High-Resolution Image Sequence Interpolation", *Proceedings for IEEE TENCON. IEEE Region 10 Annual Conference on Speech and Image Technologies for Computing and Telecommunications*, 1997, vol. 2, pp. 781-784.

Skoneczny, et al., "Classical and Neural methods of Image Sequence", *Proceedings of the SPIE, The International Society for Optical Engineering*, 2001, vol. 4535, pp. 191-204.

Szostakowski, et al., "Missing frames interpolation by artificial neural networks", *Engineering Benefits from Neural Networks. Proceedings of the International conference EANN '98*, 1998, 2 pages.

Wang, et al., "A Fast Block-Based Motion Compensation Video Frame Interpolation", *Conference Record of the Thirty-Eighth Asilomar Conference on Signals, Systems and Computers*, 2004, vol. 2, pp. 1740-1743.

Wang, et al., "Comparison of Motion-Compensated Algorithms for Frame Interpolation", *Optical Engineering*, Feb. 2003, vol. 42, No. 2, pp. 586-590.

Wang, et al., "On Motion-Compensated Algorithms for Frame Interpolation", *Proceedings of the Fourth IASTED International Conference on Signal and Image Processing*, 2002, pp. 419-423.

Wittebrood, et al., "Tackling Occlusion in Scan Rate Conversion Systems", *Digest of Technical Papers, International Conference on Consumer Electronics*, 2003, pp. 344-345.

Yoon, et al., "Frame Interpolation Using Transmitted Block-Based Motion Vectors", *Proceedings International Conference on Image Processing*, 2001, vol. 3, pp. 856-859.

Zhai, et al., "A Low Complexity Motion Compensated Frame Interpolation Method", *IEEE International Symposium on Circuits and Systems*, 2005, vol. 5, pp. 4927-4930.

Zhao, et al., "A New Algorithm for Motion-Compensated Frame Interpolation", *IEEE International Symposium on Circuits and Systems*, May 1993, vol. 1, pp. 9-12.

Baker, et al., "A Layered Approach to Stereo Reconstruction," *Proceedings of Computer Vision and Pattern Recognition Conference*, Jun. 1998, pp. 434-441.

Baroncini, et al. "The Image Resolution of 35mm Cinema Film in Theatrical Presentation," *SMPTE Imaging Journal*, vol. 113, No. 2&3, Feb./Mar. 2004, pp. 60-66.

Borcsok, et al. "Generation of 3D Image Sequences from Mixed 2D and 3D Image Sources," *SCI 2001, The $5^{th}$ Multi-Conference on Systemics, Cybernetics and Informatics*, Jul. 22-25, Florida, USA, 2001.

Burt, et al., "The Laplacian Pyramid as a Compact Image Code," *IEEE Transactions on Communications*, vol. 31 (4), pp. 532-540 (1983).

Debevec, et al., "Modeling and Rendering Architecture from Photographs: A Hybrid Geometry- and Image-based Approach," *Proceedings of SIGGRAPH '96*, New Orleans, Louisiana, Aug. 4-9, 1996, pp. 11-20.

Dunkley, "A New 3-D from 2-D Virtual Display Process," *Proceedings of SPIE*, vol. 1915, Stereo Displays and Applications IV, San Jose, Feb. 1, 1993, San Jose, CA, pp. 132-140.

Ernst, "Motion Compensated Interpolation for Advanced Standards Conversion and Noise Reduction," Signal Processing of HDTV, III, pp. 319-328 (Sep. 4, 1991).

Feldman, et al., "Interactive 2D to 3D stereoscopic image synthesis," *Proceedings of SPIE* vol. 5664 Stereoscopic Displays and Virtual Reality Systems XII, San Jose, CA, Jan. 17-19, 2005.

Garcia, "Approaches to Stereoscopic Video Based on Spatio-Temporal Interpolation," Proceedings of SPIE, vol. 2653, Stereoscopic Displays and Virtual Reality Systems III, Jan. 30-Feb. 1, 1996, San Jose, CA, pp. 85-95.

Hanna, et al., "Combining stereo and motion analysis for direct estimation of scene structure". In Proceedings IEEE International Conference on Computer Vision, Berlin, Germany, pp. 357-365, May 11-14, 1993.

Hanna, "Direct multi-resolution estimation of ego-motion and structure from motion". In Proceedings IEEE Workshop on Visual Motion, Nassau Inn, Princeton, New Jersey, Oct. 7-9, 1991, pp. 156-162.

Harman, "An Architecture for Digital 3D Broadcasting," Proceedings of SPIE, vol. 3639, Stereoscopic Displays and Virtual Reality Systems VI, Jan. 25-28, 1999, San Jose, CA, pp. 254-259.

Harman, "Home Based 3D Entertainment—An Overview," Proceedings of IEEE International Conference on Image Processing, Sep. 10-13, 2000, Vancouver, Canada, pp. 1-4.

Harman, et al., "Rapid 2D-to-3D Conversion," Proceedings of SPIE, vol. 4660, Stereoscopic Displays and Virtual Reality Systems IX, Jan. 21-24, 2002, San Jose, CA, pp. 78-86.

Healey, et al., "Global Color Constancy: Recognition of objects by use of illumination invariant properties of color distributions," Journal of the Optical Society of America A, 11(11):3003-3010, Nov. 1994.

Hoberman, "Depth Painting: the Interactive Transformation of Existing Images into Stereoscopic 3D," Proceedings of SPIE, vol. 2177, Stereoscopic Displays and Virtual Reality Systems, Feb. 8-10, 1994, San Jose, CA, pp. 78-85.

Hodges, "Tutorial: Time-Multiplexed Stereoscopic Computer Graphics," *IEEE Computer Graphics and Applications*, Mar. 1992, pp. 20-20.

Horry, et al. "Tour Into the Picture: Using a Spidery Mesh Interface to Make Animation from a Single Image," Proceedings of Siggraph '97, Aug. 3-8, 1997, LA, CA, pp. 225-232.

Kennel, "Digital Film Scanning and Recording: The Technology and Practice," SMPTE Journal, pp. 174-181 (1994).

Kim, et al., "Stereoscopic Conversion of Monoscopic Video by the Transformation of Vertical-to-horizontal Disparity," Proceedings of SPIE, vol. 3295, Stereo Displays and Virtual Reality Systems V, San Jose, CA, Jan. 26-29, 1998, pp. 65-75.

Kim, et al., "Synthesis of a High-resolution 3D-stereoscopic Image Pair from a High Resolution Monoscopic Image and a Low-resolution Depth Map," Proceedings of SPIE, vol. 3295, Stereo Displays and Virtual Reality Systems V, San Jose, CA, Jan. 26-29, 1998, pp. 76-86.

Kumar, et al., "3D Manipulation of Motion Imagery," Image Processing, 2000. Proceedings. 2000 International Conference on Sep. 10-13, 2000, Piscataway, NJ, USA, IEEE, pp. 17-20, Sarnoff Corporation.

Kumar, et al., "Direct multi-resolution estimation of ego—motion and structure from motion". In Proceedings IEEE Workshop on Visual Motion, Nassau Inn, Princeton, New Jersey, Oct. 7-9, 1991, pp. 156-162.

Kumar, et al., "Representation of scenes from collection of images," In Proc. IEEE Wkshp. on Representation of Visual Scenes, Cambridge, MA 1995.

Levinson, et al., "Development of an Autostereoscopic Monitor and 2D to 3D Conversion for Medical and Surgical Uses; Requirements, Clinical Trials and Degree of Acceptance," Proceedings of SPIE, vol. 3639, Stereoscopic Displays and Virtual Reality Systems VI, Jan. 25-28, 1999, San Jose, CA, pp. 36-43.

Matsumoto, et al., "Conversion System of Monocular Image Sequence to Stereo using Motion Parallax," Proceedings of SPIE, vol. 3012, Stereo Displays and Virtual Reality Systems IV, San Jose, Feb. 11-14, 1997, pp. 108-115.

McAllister, "Stereo Pairs from Linear Morphing," Proceedings of SPIE, vol. 3295, Stereoscopic Displays and Virtual Reality Systems V, Jan. 26-29, 1998, San Jose, CA, pp. 46-52.

Morton, et al., "Assessing the Quality of Motion Picture Systems from Scene-to-Digital Data," SMPTE Journal, vol. 111, No. 2, Feb./Mar. 2002, pp. 85-96.

Murata, et al., "A Real-Time 2-D to 3-D Image Conversion Technique Using Computed Image Depth," SID Symposium Digest of Technical Papers, May 1998—vol. 29, Issue 1, pp. 919-923.

Okino, et al., "New Television with 2D/3D image conversion technologies," Proceedings of SPIE, vol. 2653, Stereoscopic Displays and Virtual Reality Systems III, Jan. 30-Feb. 1, 1996, San Jose, CA, pp. 96-105.

Panabaker, et al. "IMAX HD—A High Definition Motion Picture System," 135th SMPTE Technical Conference, Oct. 29-Nov. 2, 1993, Los Angeles, CA.

R. Kumar, et al., "Direct recovery of shape from multiple views: A parallax based approach". In International Conference on Pattern Recognition, pp. 685-688 (1994).

Rotem, et al., "Automatic video-to-stereoscopic-video conversion," *Proceedings of SPIE* vol. 5664 Stereoscopic Displays and Virtual Reality Systems XII, San Jose, CA, Jan. 17-19, 2005.

Sawhney, "3D Geometry from Planar Parallax," In Proc. IEEE Computer Vision and Pattern Recognition Conference, Seattle, WA, Jun. 21-23, 1994.

Sawhney, "Hybrid Stereo Camera: An IBR Approach for Synthesis of Very High Resolution Stereoscopic Image Sequences," Computer Graphics. Siggraph 2001. Conference Proceedings, Los Angeles, CA, Aug. 12-17, 2001, pp. 451-460.

Scharstein, "stereo vision for view synthesis," *IEEE Computer Society Conference on Computer Vision and Pattern Recognition (CVPR'96)*, pp. 852-858, San Francisco, CA, Jun. 1996.

Shao, et al., "Automatic 2D to 3D Footage Conversion for 3D Glasses-free Display Systems," ICCV 2003 demonstrations, Oct. 13-16, 2003.

Slater, et al., "The Illumination-Invariant Recognition of 3-D Objects Using Local Color Invariants," IEEE Transactions on Pattern Analysis and Machine Intelligence, 18(2):206-210, Feb. 1996.

Stiller, et al., "Estimating Motion in Image Sequences," IEEE Signal Processing Magazine, Jul. 1999, pp. 70-91.

Szeliski, "Scene Reconstruction from Multiple Cameras," Proceedings of IEEE International Conference on Image Processing, Sep. 10-13, 2000, Vancouver, Canada, pp. 13-16.

Tam, et al., "Stereoscopic Image Rendering Based on Depth Maps Created from Blur and Edge Information," *Proceedings of SPIE* vol. 5664 Stereoscopic Displays and Virtual Reality Systems XII, San Jose, CA, Jan. 17-19, 2005.

Valencia, et al., "Synthesizing stereo 3D views from focus cues in monoscopic 2D images," Proceedings of SPIE, vol. 5006, Stereoscopic Displays and Virtual Reality Systems X, Jan. 21-23, 2003, Santa Clara, CA.

International Preliminary Examination report for PCT/US2001/44995, dated Aug. 4, 2002.

International Search Report for PCT/US2001/44995, dated Apr. 4, 2002.

Supplementary European Search Report for Application No. 01989802.2, dated Mar. 23, 2009.

International Preliminary Examination Report for PCT/IB2003/00919, dated Mar. 24, 2004.

International Search Report for PCT/IB2003/00919, dated Dec. 8, 2003.

International Preliminary Examination report for PCT/IB2007/001726, dated Jan. 6, 2009.

International Search Report for PCT/IB2007/001726, dated Feb. 12, 2008.

International Preliminary Examination report for PCT/IB2007/000188, Jul. 29, 2008.

International Search Report for PCT/IB2007/000188, dated Jun. 26, 2007.

Chinese Application No. 200780003734.3, Office Action mailed on Aug. 6, 2010, 15 Pages of Office Action and 2 Pages of English Translation.

European Application No. 01 989 802.2-2218, Communication pursuant to Article 94(3) EPC mailed on Sep. 9, 2010, 4 pages.

European Patent Application No. 07789439.2, Extended European Search Report, mailed Oct. 14, 2010 (6 pages).

European Patent Application No. 09153591.4, Extended European Search Report, mailed Oct. 14, 2010 (8 pages).

* cited by examiner

METHODS AND SYSTEMS FOR CONVERTING 2D MOTION PICTURES FOR STEREOSCOPIC 3D EXHIBITION

RELATED APPLICATIONS

This application is the U.S. national phase of International Application No. PCT/IB2007/001726 filed on Jun. 25, 2007 and published in English as International Publication No. WO 2007/148219 A2 on Dec. 27, 2007, which application claims priority to U.S. Provisional Application No. 60/816,272 filed on Jun. 23, 2006, the contents of both of which are incorporated herein in their entirety by this reference.

FIELD OF THE INVENTION

The present invention relates generally to image processing and more specifically to creating a converted image sequence from an original image sequence.

BACKGROUND OF THE INVENTION

Humans are capable of perceiving depth or distance in a three-dimensional world because they are equipped with binocular vision. Human eyes are separated horizontally by about 2.5 inches, and each eye perceives the world from a slightly different perspective. As a result, images projected onto the retinas of two eyes are slightly different, and such a difference is referred to as binocular disparity. As part of the human visual system, the brain has the ability to interpret binocular disparity as depth through a process called stereopsis. The ability of the human visual system to perceive depth from binocular disparity is called stereoscopic vision.

The principles of stereopsis have long been used to record three-dimensional (3D) visual information by producing two stereoscopic 3D images as perceived by human eyes. When properly displayed, the stereoscopic 3D image pair would recreate the illusion of depth in the eyes of a viewer. Stereoscopic 3D images are different from volumetric images or three-dimensional computer graphical images in that they only create the illusion of depth through stereoscopic vision while the latter contain true three-dimensional information. One common way of recording stereoscopic 3D images includes using a stereoscopic 3D camera equipped with a pair of horizontally separated lenses with an inter-ocular distance equal or similar to the human eye separation. Like human eyes, each camera lens records an image, which by convention are called a left-eye image, or simply a left image, and a right-eye image, or simply a right image. Stereoscopic 3D images can be produced by other types of 3D image capture devices or more recently by computer graphics technology based on the same principle of stereopsis.

When a pair of stereoscopic 3D images are displayed to a viewer, the illusion of depth is created in the brain when the left image is presented only to the viewer's left eye and the right image is presented only to the right eye. Special stereoscopic 3D display devices are used to ensure each eye only sees a distinct image. Technologies used in those devices include polarizer filters, time-sequential shutter devices, wavelength notch filters, anaglyph filters and lenticular/parallax barrier devices. Despite the technology differences in those stereoscopic 3D display devices, the depth perceived by a viewer is mainly determined by binocular disparity information. Furthermore, the perceived size of an object in stereoscopic 3D images is inversely related to the perceived depth of the object, which means that the object appears small as it moves closer to the viewer. Finally, the inter-ocular distance of 3D camera also changes the perceived size of the object in resulting stereoscopic 3D images.

Stereoscopic 3D motion pictures are formed by a pair of stereoscopic 3D image sequences produced by stereoscopic 3D motion picture cameras or by computer graphics or a combination of both. In the following discussion, the term "3D" is used to mean "stereoscopic 3D," which should not be confused with the same term used in describing volumetric images or computer graphical images that contain true depth information. Similarly, the term "disparity" is used to mean "binocular disparity."

Producing a 3D motion picture is generally a more costly and more complex process than making a regular two-dimensional (2D) motion picture. A 3D motion picture camera is usually much bulkier and heavier than a regular 2D camera, and it is often more difficult to operate. Special expertise in 3D cinematography is required throughout the entire production process including capturing, video effects (VFX), rendering and editing in order to produce good 3D reality. To this day, there are only a relatively small number of 3D motion picture titles available in comparison with a vast library of 2D motion pictures.

An alternative approach of producing 3D motion pictures is to capture images in 2D and digitally convert the resulting footage into 3D images. The basic concept of this approach is that left and right images can be generated from an original 2D image, if appropriate disparity values can be assigned to every pixel of the 2D image. The disparity values of an object can be directly calculated from its depth values. An object closer to the viewer produces a larger disparity value than that resulting from a distant object. The disparity approaches zero when an object moves away towards infinity. To create believable 3D illusions from a 2D image, correct depth information is needed for the entire image, which can either be computed in some cases, or estimated based on viewer's subjective interpretation of the scene. All depth values assigned to image pixels forms an image referred to as a depth map, and the depth map is called dense if depth values are assigned for all pixels of the image. To convert an image sequence into 3D, dense depth maps are collected for all frames in the image sequence, and the resulting image sequence is a depth map sequence.

To directly estimate a depth map sequence closely matching the real-world scene captured in a 2D image sequence would be very a difficult task. Instead, it is common practice to indirectly estimate the depth maps by defining individual objects in a scene. An object is defined by its surface occupying a volume in a three-dimensional world, and it is also defined by its movement and deformation from one frame to next. Software tools are available to facilitate the task of defining objects using solid modeling, animation and other techniques. However, due to the existence of motion in a scene, modeling and animating all objects in a 2D scene can be a time-consuming and labor-intensive process.

Modeling an object may require that the object first be defined from the rest of the image over every frame. The most common methods for object definition are rotoscoping and matting. A rotoscoping method defines an object by tracing the contour of the object in every frame. A matting method includes extracting object masks based on luminance, color, motion or even sharpness resulting from lens focus. Both rotoscoping and matting methods are usually performed manually using various types of interactive software tools. Although many software tools provide keyframing and motion tracking capability to speed up the operation, object definition remains labor-intensive and time-consuming.

A dense depth map sequence can be computed after all objects have been defined for every frame of the image sequence. The disparity values are then calculated directly from depth values and used to generate 3D images. However, a dense depth map does not guarantee "dense" results. The resulting 3D images inevitably contain "holes" called occlusion regions. An occlusion region is a portion of an object which is occluded by another foreground object. Pixels within an occlusion region have no disparity values because they do not have correspondence in the original 2D images. In general, occlusion regions always accompany depth discontinuity. In some cases, an occlusion region may be filled with corresponding information about the background object revealed in other image frames. In other cases, the missing information needs to be "faked" or "cloned" in order to fill the holes. Improper occlusion region filling may result in visible artifacts in the 3D images.

For a given 2D scene, the size and distribution of occlusion regions in the converted 3D images are determined by the choice of camera parameters used for computing disparity from depth. Key camera parameters typically include camera position, inter-ocular distance and lens focal length. Normally, the camera parameters are selected based on the desired 3D look, but minimizing occlusion regions may also be a factor in consideration. The final 3D images are computed with a selected set of camera parameters and with all occlusion regions filled properly. A full feature motion picture may contain numerous image sequences called scenes and each scene may have up to hundreds of image frames.

SUMMARY OF THE INVENTION

Methods, processes and systems according to embodiments of the present invention relate to converting conventional 2D motion pictures for 3D cinematic exhibition, known as the IMAX® 2D-to-3D Conversion technology, or otherwise known as the DMR 3D technology. Certain embodiments may be used to convert a 2D motion picture to 3D to meet a day-and-date cinematic release schedule. Some embodiments may be used to convert any 2D image sequences to 3D for any other display applications. For the purpose of computing stereoscopic 3D views of a 2D image sequence available in a form of 2D image data sequence, a set of image elements called image data cues can be collected from the 2D image data sequence. The collected image data cues together with other essential computing information are stored as processing information. A process architectural model provides a systematic process for collecting an adequate set of processing information in order to produce desirable 3D visual quality. The disclosed methods, processes and system are scalable to schedule changes and adaptable to frequent version changes to the 2D image data sequence. The disclosed process architectural model is equally applicable to other motion picture digital re-mastering applications including re-mastering a motion picture to a different frame rate or enhancing the image quality of a motion picture.

The process architectural model may include a core conversion block step. A first step in some embodiments of the core conversion block is to collect a set of process information for the intended conversion. For 2D-to-3D conversion, a typical set of processing information may include image data cues, editorial information, computing instructions, rendering parameters, as well as other image elements. Some types of processing information are collected at the scene level, while other types are collected at the object level. Various types of image data cues at the object level are collected and a layered structure can be used to facilitate processing objects that have distinct characteristics. Within each layer, image data cues can be collected using a multi-mode computing structure in which various methods are grouped into multiple modes based on the level of automation and versatility. For instance, an operation mode analyzer can select the most appropriate methods for processing different types of objects. A similar multi-mode computing structure also can be used at the scene finishing stage. The scene finishing stage may be the last processing stage of the core conversion block. For other types of motion picture re-mastering applications, the configuration of the core conversion block may change according to the types of processing information required for the applications.

Processing information collected at the core conversion block can be modified and updated until desirable 3D visual quality is achieved. The final set of processing information can be stored in render data records that are sufficient for producing the converted 3D image data sequences. The render data records can be updated following the changes to the 2D image data sequence. After the 2D image data sequence is finalized, the latest version of render data records can be retrieved for computing the final 3D image data sequences in an automated mode or in other modes based on the final version of the 2D image data sequence. Implementation of an architectural model, including the core conversion block may occur in a system. Systems according to various embodiments of the present invention are applicable to other motion picture digital re-mastering applications such as motion picture enhancement or frame rate conversion.

These embodiments are mentioned not to limit or define the invention, but to provide examples of embodiments of the invention to aid understanding thereof. Embodiments are discussed in the Detailed Description, and further description of the invention is provided there. Advantages offered by the various embodiments of the present invention may be further understood by examining this specification.

DESCRIPTION OF THE DRAWINGS

These and other features, aspects, and advantages of the present invention are better understood when the following Detailed Description is read with reference to the accompanying drawings.

DESCRIPTION OF THE INVENTION

Embodiments of the present invention provide methods and systems for converting 2D motion pictures for stereoscopic 3D exhibitions. Some embodiments may be used to convert a 2D motion picture into a 3D motion picture to be released on the same release date as that for the original 2D motion picture, which is known as a day-and-date release. Generally, a production process of a motion picture includes frequent changes to the contents of the motion picture and the contents are not locked until very close to the release date. Once the contents of the motion picture are locked, a color correction process is applied to the images to achieve the final look intended by the filmmakers. Traditionally, the color correction is done photo-chemically through a process known as "color timing", and more recently it is performed by digital means that provide much finer controls. The finalized digital version of the motion picture is referred to as a digital intermediate (DI). As a result, there is only a very short time window available after the delivery of the final DI image data and before the motion picture release date. For a day-and-date release, all the conversion processing must be performed on the DI within such a time window. Therefore, the conversion process must be scalable and adaptable to a changing production schedule.

To convert a 2D motion picture or a 2D image sequence into 3D, an adequate level of processing information (PI) is collected. A typical set of PI includes image data cues, editorial information, computing instructions, computing parameters, and other image elements such as VFX elements. Image data cues (IDC) are image elements and other data that are extracted from the 2D image sequence for the purpose of computing 3D images. Most types of IDC are those directly related to the computing of the missing depth dimension, including shape, color, geometry, depth, occlusion and motion. In general, collecting more accurate and more complete IDC leads to better 3D image quality, but it also consumes more time and cost. The accuracy and completeness of IDC can be described by the level of details. As the level of detail increases, the quality of the 3D image increases until a point at which further increase in the level of details yields only marginal benefits. One method is to collect IDC only to a level of details adequate for producing acceptable 3D image quality. The level of details of IDC has an impact on the other types of PI, including scene editorial information and scene geometry layout. Embodiments of the method of determining an adequate level of details is described in the next section as the architectural model.

The Architectural Model

Figure 1:
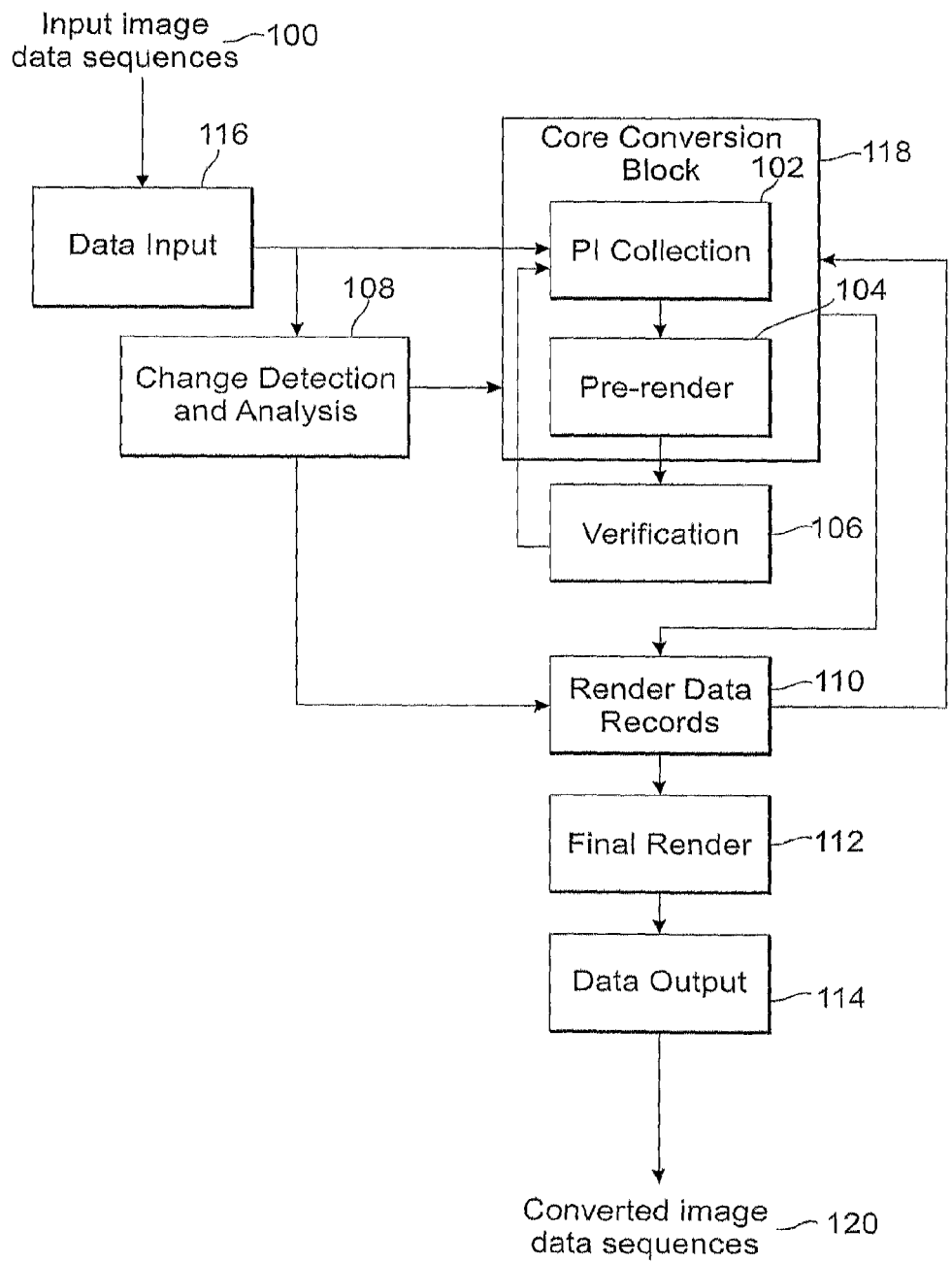
FIG. 1 illustrates a flow diagram of a process architectural model for motion picture re-mastering process according to one embodiment of the present invention.

An embodiment of an architectural model is depicted in FIG. 1. The architectural model consists of multiple functional blocks including a core conversion block 118, a verification block 106, a change detection and analysis block 108, a render data records block 110, and a final render block 112. The architectural model can be applicable to a wide range of motion picture and image sequence conversion processes including 2D-to-3D conversion, frame rate conversion, or image enhancement, or any other conversion processes that contributes to image conversion that facilitates further image enhancement within a projector to produce enhanced images. Embodiments of the 2D-to-3D conversion is discussed below.

The core conversion block 118 includes a PI collection block 102, where PI is collected, and a pre-render block 104, where initial conversion results are rendered. The PI collection block 102 collects an initial set of from 2D input image data sequences 100 or otherwise known as source image data sequences. As discussed below, various methods can be used to collect different types of IDC from different types of image contents. As shown in FIG. 1, the initial set of IDC is verified to determine whether the level of details is adequate. The verification process includes the pre-render block 104 and the verification block 106. The pre-render block 104 computes 3D images from source 2D image data sequences based on the initial set of IDC. The rendered 3D images are visually examined at the verification block 106 by trained personnel using a stereoscopic 3D display system that simulates the viewing environment of a typical 3D cinematic theater. If the quality of the 3D images is acceptable, the initial set of IDC is considered adequate, and then saved by the render data records block 110 together with other types of PI collected including the computing instructions and parameters used by the pretender block 104.

If the 3D images are deemed unacceptable, the initial set of IDC is considered inadequate and a higher level of details is needed. The collection block 102 once again extracts more IDC from the source image data, aiming for a higher level of details. Once a new set of IDC is collected, the pre-render block 104 computes new 3D images based on the latest set of IDC. The resulting 3D images are once again visually examined by the verification block 106. If the results are satisfactory, the latest set of IDC is considered adequate, and is saved as a subset of the latest version of render data records (RDR). The RDR contains IDC and other types of PI, especially the computing instructions and parameters that are sufficient for producing the latest 3D image results. The latest version of RDR replaces the previous RDR version stored by the render data records block 110. If the resulting 3D images are still deemed unacceptable, the level of details will be raised and more IDC can be collected by the collection module 102. This process is repeated until the resulting 3D image quality is acceptable by the verification personnel. Once the 3D results are accepted, the latest set of IDC collected is considered adequate, and it is saved together with the latest versions of other types of PI including the latest computing instructions and parameters as the current version of RDR. The saved RDR can be retrieved from the render data records block 110 and used whenever necessary to repeat all the computations required to produce the latest 3D image results. The current version of RDR also contains the latest editorial decision list associated with the latest version of source image data sequences. The current version of RDR may also contain some intermediate results already computed by the pre-render block 104. Although those intermediate results can be re-computed from the saved RDR, they may be included as part of the current version of RDR to reduce future computations in the final render block 112 since re-computation may require time and increased computing costs.

In the process of converting a 2D motion picture to 3D, the input image data sequences 100 in FIG. 1 includes original 2D image sequence or the 2D motion picture DI, or otherwise known as source image data sequences. The source image data sequences may be converted to a specified file format or a set of different file formats by the data input block 116. If there are no changes to the source image data sequences, the converted image data sequences 120 computed by the final render block 112 are final converted 3D image data. For example, all source image data sequences are final in a conversion of a 2D library motion picture to 3D.

Figure 2:
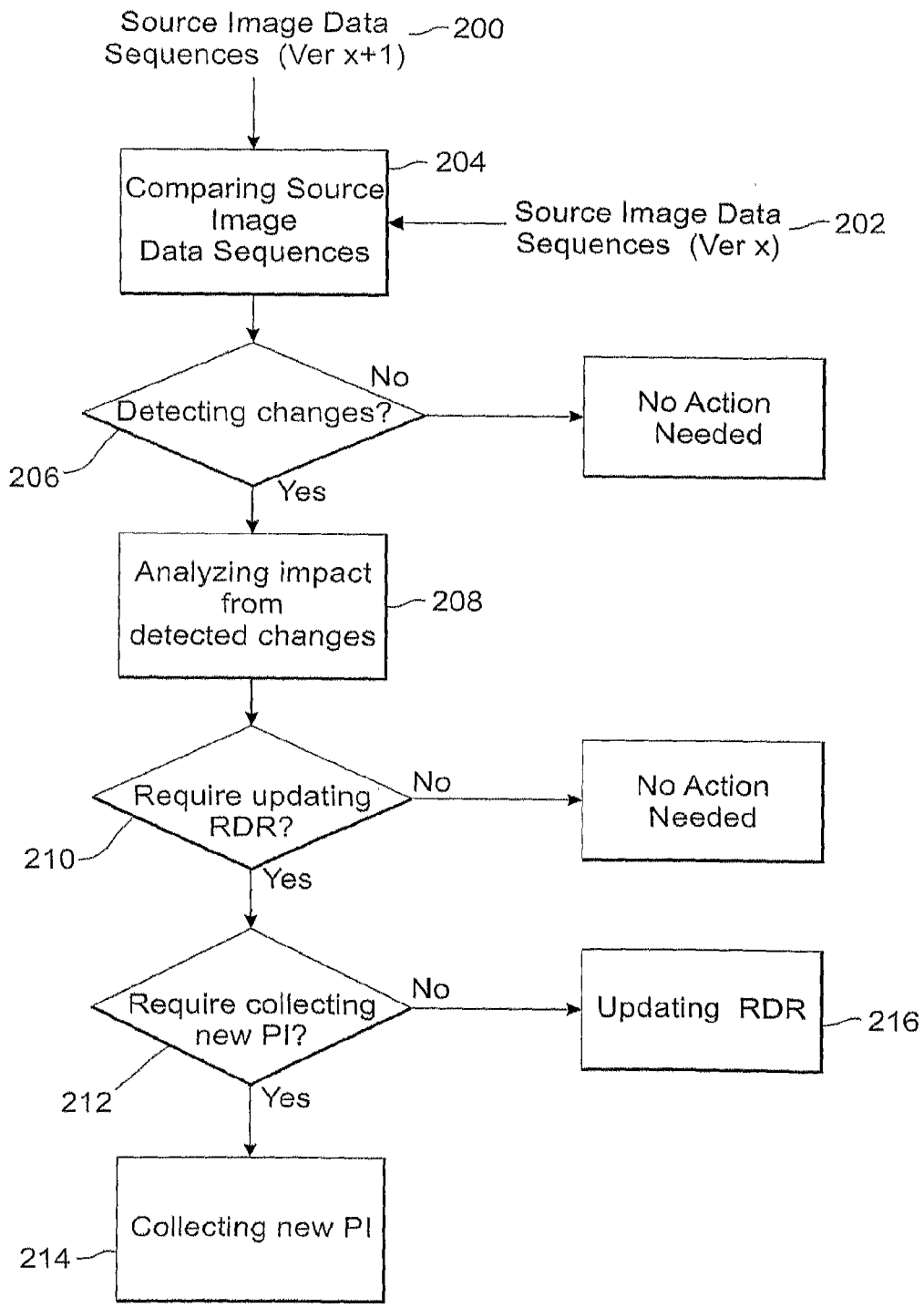
FIG. 2 illustrates flow diagram of a change detection and analysis block according to one embodiment of the present invention.

For a new motion picture to be converted to 3D for day-and-date releases, the conversion process may start before the final DI is available. The source image data sequences may undergo frequent version changes before they are finally locked. The architectural model of FIG. 1 includes a change detection and analysis block 108, which detects changes in the latest version of the source image data sequences by comparing it with the previous version saved by block 108. If changes are detected, the change detection and analysis block 108 determines how to update the current version of RDR. An embodiment of such a determination is illustrated in FIG. 2. The latest version of source image data sequences (Version x+1) 200 is compared in step 204 with the previous version of source image data sequences (Version x) 202. If changes detected in step 206, impact from detected changes are analyzed in step 208 and then a decision is made in step 210 on whether the current version of RDR needs to be updated. If the only changes are the results from color-timing, the RDR may not need to be updated. For example, the computing instructions and render parameters may be color independent. Such processing may allow conversion of final color-timed source image data sequences to 3D in a fully automated mode by the final render block 112 in FIG. 1 using the latest version of RDR saved by the render data records block 110. Such automated rendering may allow the final computing of the converted image data sequences 120 to be performed relatively quickly.

Figure 3:
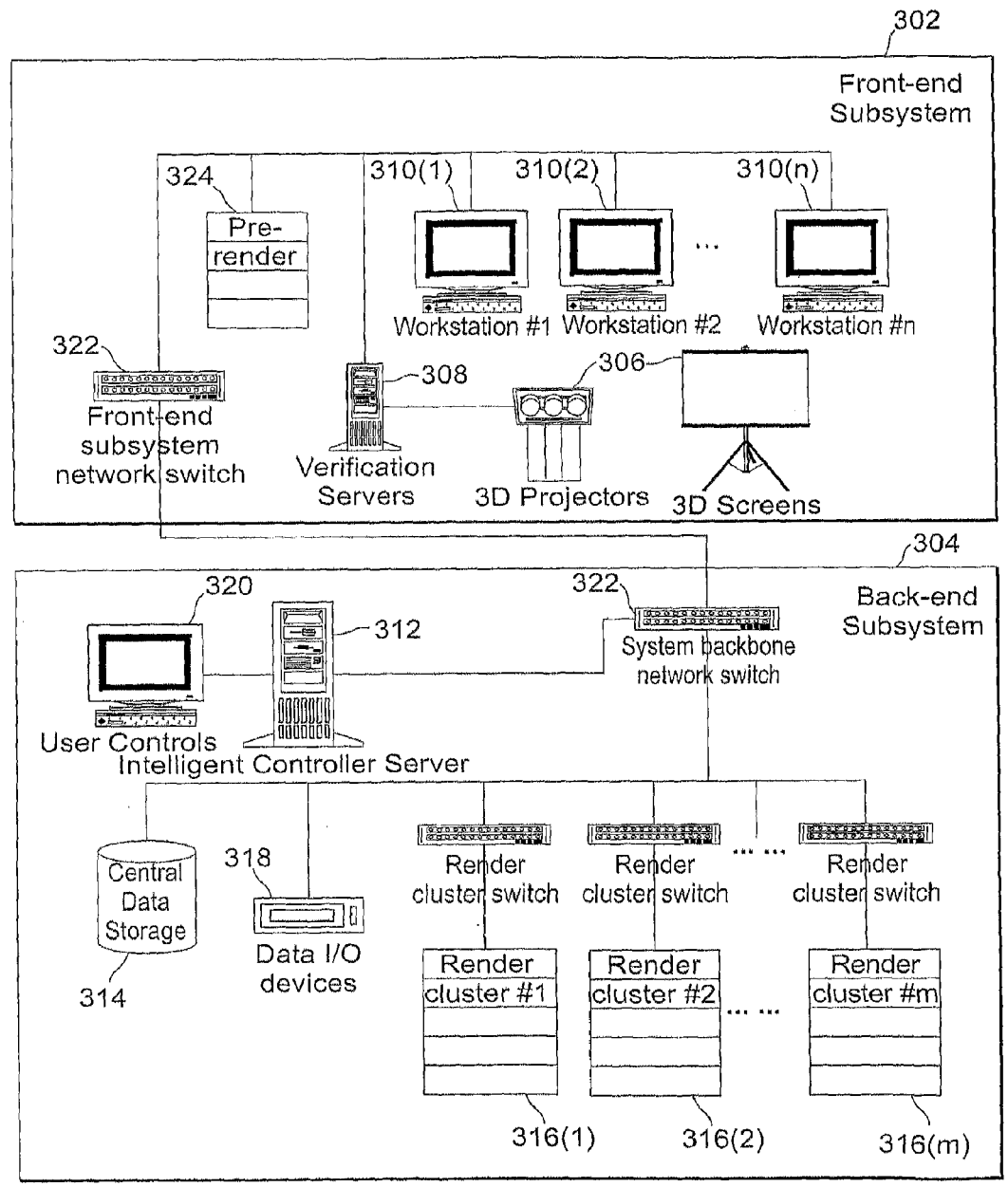
FIG. 3 illustrates a motion picture 2D-to-3D conversion system according to one embodiment of the present invention.

If the detected changes are determined to require updating RDR in step 210, the change detection and analysis block 108 can also decide in step 212 if the changes require collecting new PI from the new source image data sequences. In some embodiments, collecting new PI may be avoided. For example, some editorial changes or rendering parameter changes can be handled by directly updating the current version of RDR in step 216. However, if image contents are changed, collecting new PI may be required in step 214. Embodiments of the architectural model can allow the conversion process to be adaptable to version changes in the source image data sequences until the image data is finalized.
System Implementations FIG. 3 shows one embodiment of a system implementation of a 2D-to-3D conversion process according to various embodiments of the present invention. The system implementation described in FIG. 3 can also be applied to any other motion picture and image conversion processes such as frame rate conversion, image enhancement, and any other image enhancement conversions or a conversion which facilitates further image enhancement within a projector to produce the enhanced images.

The functional blocks of the architectural model in FIG. 1 can be implemented into two subsystems: the front-end subsystem 302 and the back-end subsystem 304. Those two subsystems are connected through a network connection 322.

The front-end subsystem 302 can be designed for collecting, verifying and updating PI required for producing 3D images. It can provide functions of the PI collection block 102, the verification block 106 and the change detection and analysis block 108 in FIG. 1 that may require human interactions. The front-end subsystem 302 may include the pre-render block 104, for example when the front-end subsystem 302 is implemented in a separate location away from the back-end subsystem 304. In another embodiment of the present invention, the pre-render block 104 shares the same hardware and software with the final render block 112, implemented in the back-end subsystem 304.

The back-end subsystem 304 can be designed for automated rendering of the final converted image data sequences of a motion picture with high efficiency. It can implement the full functions of the final render block 112 and the render data records block 110. The functions of the data input block 116 and the data output block 114 also can be implemented at the back-end subsystem 304. One component of the back-end system 304 is an intelligent controller server 312, which manages the motion picture conversion process including that of the front-end subsystem 302. As discussed previously, the back-end subsystem 304 may also provide the function of the pre-render block 104 when it shares the same hardware and software with the final render block 112.

The details of embodiments of both subsystems are disclosed below.

Front-End Subsystem 302

One function of the front-end subsystem 302 is to provide both user-interactive capability and automated rendering capability for collecting an adequate set of PI, especially the IDC, from source image data sequences. As disclosed previously, this function is provided through a recursive process of IDC collection and verification. Collecting various types of IDC required for the conversion is a labor-intensive and time-consuming process because human interactions and human decisions are often needed in the collection process. In some embodiments, an increasing portion of those labor-intensive computations can be automated or semi-automated. Such automated and semi-automated computations may implemented in the pre-render 324.

Many user-interactive functions used for PI collection are presently available from different types of commercial software products. The front-end subsystem 302 provides an open-platform that supports those commercial software products. The supported software products generally provide render scripting capability. The render scripting capability ensures that all processing steps selected by a user using interactive means can be recorded as render scripts and can be repeated automatically at a render by executing the recorded render scripts. The render scripting capability of a supported software product can execute the render scripts on the parallel and distributed computing platform of the pre-render 324 as well as the automated final render 316.

The PI collection block 102 can also deploy automated and semi-automated custom software applications to improve process efficiency. Those customer software applications are usually designed for efficiently collecting a certain types of IDC under special conditions. Custom software applications deployed in the system of FIG. 3 can support a render scripting capability similar to the commercial software. Some semi-automated custom software applications provide their own user graphical interface (GUI) and some other custom software applications are implemented as a plug-in application of a commercial software product. The automated and semi-automated functions of the custom software applications are executable by the pretender 324.

The front-end subsystem 302 deploys multiple computer workstations 310 (1)-(*n*) that provide GUI capability to support user interactivity of both commercial and custom software applications. The workstations 310 (1)-(*n*) may also provide render capability to supplement the pre-render 324. The pre-ender 324 may include at least one computing device. One configuration of the pre-render 324 is a computer cluster equipped with multiple processors that provide parallel and distributed computing capability, as shown in FIG. 3. The processes of collecting various types of IDC are saved as render scripts, which can be distributed to the multiple processors of the pre-render for fast computing. Each pre-render processor computes a portion of the task independently and in parallel with other processors. A computer cluster is one, nonexclusive way to provide required computing power for IDC collection tasks and for eventual rendering of 3D images based on the collected IDC and PI. The computing capacity of a computer cluster is scalable to meet the changing needs for computing power. The pre-render 324 is controlled and managed by the intelligent controller 312 of the back-end subsystem 304. The specific computing instructions and parameters executed by the pre-render 324 are saved as RDR in render data records block 110 whose functions are implemented in the central data storage 314. Some embodiments of the saved RDR are in a form of text-based render scripts files that are supported by both commercial and custom software applications. The saved RDR can be repeatedly executed on the same or a different computer cluster to produce the same results.

The front-end subsystem 302 supports at least one 3D projection system 306 for the visual verification of the 3D images rendered by the pre-render 324. The rendered left-eye and right-eye image data can be streamed by a verification server 308 to be played at a right frame rate by a 3D projector onto a 3D screen. Multiple 3D image projection systems 306 may be required, with each having a separate verification server 308. For motion picture applications, each 3D image projection system may provide a viewing experience that is similar, or at least scalable, to the viewing experience in a destined 3D cinematic theater. The image display area of the 3D projection system can be sufficiently large to provide viewers with a field of view similar to what is provided in the 3D cinematic theater. Such a viewing experience is typically delivered by a single 3D image projector that projects a relatively large image onto a screen, or it can be delivered by a pair of image projectors with one projector projecting left-eye images and another projector projecting right-eye images onto a screen. If polarizer glasses are used for 3D viewing, the screen preserves polarization. As long as a similar field of view is maintained, experienced verification personnel are able to evaluate the 3D quality and make decisions based on viewing the 3D images on the screen even though the screen may be smaller in size compared with the screen of a destined 3D cinematic theater.

The front-end subsystem 302 also provides computing hardware and software required for detecting changes between two different versions of image data. The supporting software applications may include a GUI to perform visual inspection on the workstations 310(1)-(*n*). The supporting software applications provide a skilled user with sufficient information to make appropriate decisions following the decision process described in FIG. 2. If direct changes to the RDR are needed, the software applications can provide a GUI that allows editing of RDR, The front-end subsystem 302 can be deployed in a distant physical location from the back-end subsystem 304 using an open platform. The front-end subsystem 302 may also be deployed in multiple physical locations from the back-end subsystem 304. Moreover, at least a portion of the user interactive functions of the front-end subsystem 302 can be outsourced to multiple third-party commercial service providers that are equipped with the right types of hardware and software as well as skilled personnel. Technical specifications regarding the types of IDC and PI that need to be collected from images can be provided to the service providers for evaluating outsourced work. Processing tasks executed at remote locations and by service providers can be recorded as render scripts and repeatable at the automated final render 316.

Back-End Subsystem 304

One function of the back-end subsystem 304 is to maintain the latest RDR and to perform image data conversion to 3D in a fully automated mode. It may also perform automated and semi-automated computing tasks of the pre-render 324. The backend subsystem 304 includes the intelligent controller server 312, a central data storage 314 and an automated render system 316(1)-(*m*). The back-end subsystem 304 also provides image data input/output functions, typically provided by data I/O devices 318 such as data tape drives, movable hard disks or optical disk drives. The central data storage 314 provides a data storage capacity sufficient for keeping different versions of source image data sequences, the converted 3D image data sequences and all necessary intermediate results on line for prompt assess. The central data storage 314 also provides the function of render data records block 110 to keep the latest version of RDR. The automated render system is typically implemented as a multi-processor computer cluster 316(1)-(*n*).

One component of the back-end subsystem 304 is the intelligent controller 312, which provides process control and process tracking functions to the entire motion picture conversion process, including both the front-end subsystem 302 and the back-end subsystems 304. The intelligent controller 312 maintains a central database that keeps and updates all information about motion picture source images and the entire conversion process, including PI and IDC collected by the front-end subsystem 302, different versions of RDR, and production management information such as processing change requests, version control and current status in the process. Based on the information, the intelligent controller 312 generates various types of real-time reports on the status of the conversion process.

In one embodiment, the intelligent controller 312 is responsible for scheduling all rendering jobs of the automated render 316 as well as the pre-render 324. It can distribute computing jobs to multiple processors based on load balance and job priorities. For a computing job that is distributed to multiple processors, the intelligent controller 312 can assemble the segmented results into a continuous scene. The intelligent controller 312 can also provide integrity checking for occasional missing or incomplete frames and sends re-render requests if errors are found.

The intelligent controller 312 can constantly monitor the status of individual processors of the automated render 316 (1)-(n). If the processor fails, it can raise an alert for repair and can reroute the stalled job to other available processors to continue processing. A diagnostics process ensures to prevent loss of data during the transition. If the intelligent controller 312 experiences a failure, the state of the system before malfunction is preserved. The intelligent controller 312 polls the render processors for their status, finds their current states and resumes the control. Data re-rendering may not be required in the case of a re-start.

The intelligent controller 312 also can monitor the operation of the image data input and output devices 318. The converted image data sequences can be formatted and output onto data apes or movable hard disks or any other data storage devices 318. The intelligent controller 312 schedules data input and output processes and reports the information back to the central database.

Human controls and interruptions of the otherwise automatically controlled process are permitted through user controls interface 320. The user controls interface 320 allows a skilled user, typically a producer or a technical producer who is responsible for the final look of the resulting 3D images to make a certain types of changes usually for the improvement of the 3D look of the converted images or for the introduction of the latest editorial decisions. Those changes are usually made through direct modifications to the RDR saved at the central data storage 314 without a need for re-collecting IDC.

The system implementations illustrated in FIG. 3 can be scalable for expanding process capacity or for easy integration of future improved software and hardware. If the front-end subsystem 302 is located at multiple remote sites, the back-end subsystem 304 can continue to provide control, tracking and data exchange functions with multiple remote sites through Internet connections or designated network connections 322. With the network connections 322, the intelligent controller 312 is capable of controlling and tracking all processes at the remote sites and collecting all PI and RDR from multiple sites. When the final source image data sequences are delivered, the back-end subsystem 304 is able to convert them into 3D images at the automated render 316 based on all the latest PI and RDR collected from multiple sites.

Core Conversion Block

Figure 4:
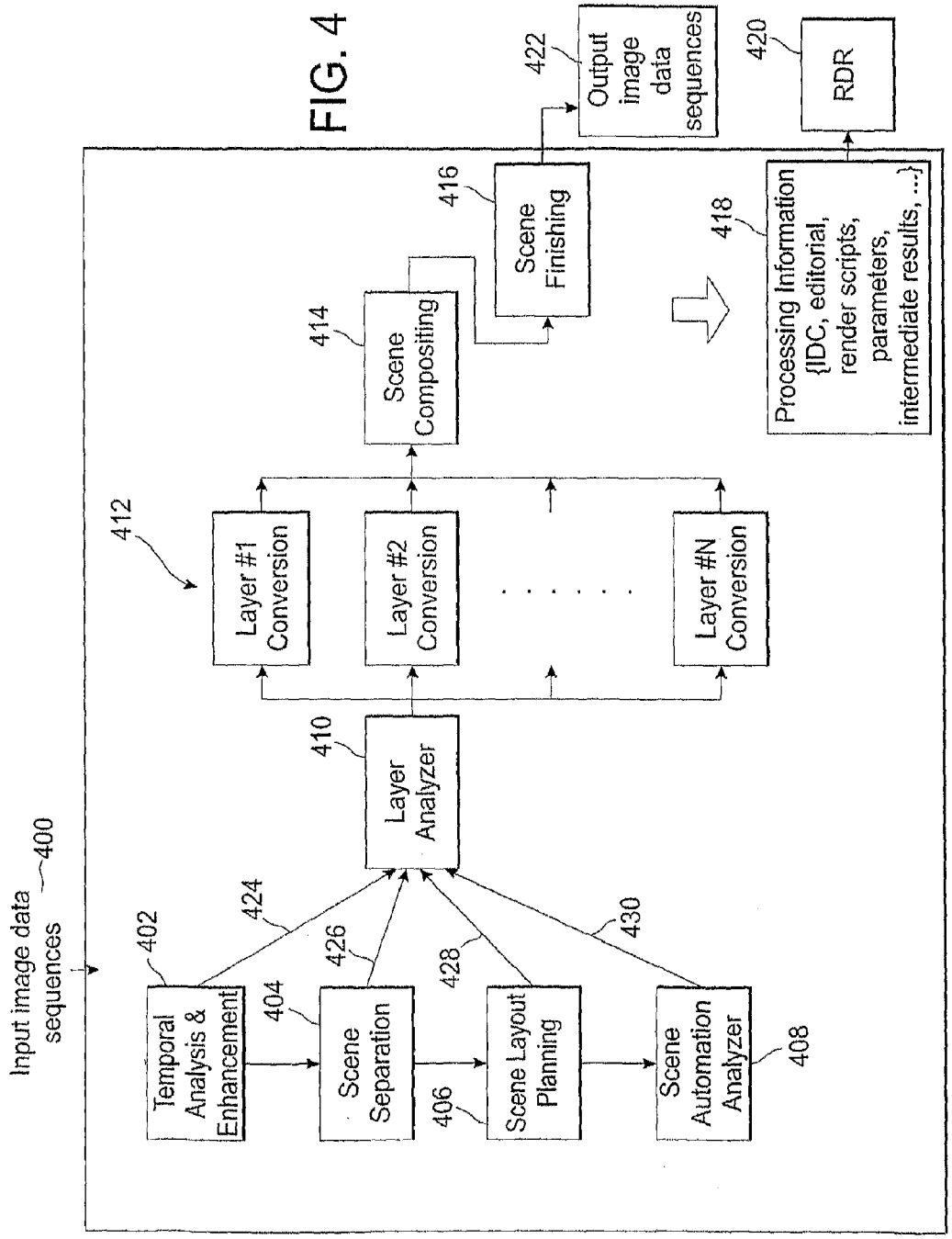
FIG. 4 illustrates a flow diagram of a core conversion block for motion picture 2D-to-3D conversion according to one embodiment of the present invention.

The core conversion block 118 in FIG. 1 can collect a set of PI required for the 2D-to-3D conversion. It can include a PI collection block 102 and a pre-render block 104. Some types of PI are various types of IDC, which are image elements and other data that are extracted from the 2D image sequence for the purpose of computing 3D images. One embodiment of the process workflow of the PI collection block 102 for motion picture 2D-to-3D conversion is depicted in FIG. 4. The process flow diagram in FIG. 4 assumes that the 2D input image data sequences 400 are available in a digital data format. If motion picture images are available in a film format, images on film must be digitized into a digital data format by a film scanner. If the input images are available in a digital data format unsupported by the conversion process, the images must be converted to a data format that is supported by the process and system.

Each block in the process workflow of FIG. 4 represents a processing stage in which a specific set of IDC or PI are collected. In the embodiment shown in FIG. 4, the first four stages, temporal analysis and enhancement 402, scene separation 404, scene layout planning 406 and scene automation analyzer 408, work at the scene level, and the subsequent layer analyzer 410, layer conversion 412 and scene compositing 414 stages perform at the object level. A motion picture is divided into scenes, and each scene consists of one or more objects. Objects are image elements separated from each other mainly by depth discontinuity. At the object level, a layered structure is used to collect IDC describing individual objects. At the last scene finishing stage 416, the collection process is back to the scene level.

The pre-render block 104 is part of the core conversion block 118 and performs required computing for all stages of FIG. 4. The functions of the pre-render block 104 are delivered generally by the pre-render 324. A portion of the pre-render functions may also be provided by the workstations 310 (1)-(n). Although the pre-render 324 functions were not explicitly depicted in FIG. 4, they are inherent in every stage of the IDC collection process. The IDC collected from all stages are saved along with other types of PI information 418 including editorial information, render scripts, computing parameters, intermediate results, etc. A sufficient set of collected PI is saved in a form of the last version of RDR to be used to producing the intended conversion results. An important feature of the present invention is that the RDR should be kept to be color-independent, which means that, if color of the source image data sequences are changed, there is no need to update the current version of RDR.

Although the process flow of FIG. 4 is explained in terms of 2D to 3D conversion the same concept of the process flow can apply to any other graphics conversion such as frame rate conversion, image enhancement, any other image enhancement conversions or a conversion that facilitates further image enhancement within a projector to produce the enhanced images. For these other conversions the algorithms within the process flow blocks may be different but the process flow of FIG. 4 can still be utilized.

Four scene level processing, stages are deployed in the core conversion block in FIG. 4 to collect IDC at scene level, including temporal analysis & enhancement 402, scene separation 404, scene layout planning 406, and scene automation analyzer 408. Each of the stages is discussed below.

Temporal Analysis & Enhancement 402

In this stage, the source image data sequences are processed by temporal processing methods to enhance image quality. A preferred implementation of the temporal processing process is the DMR (Digital Re-mastering) process by IMAX Corporation and discussed in U.S. patent application Ser. No. 10/474,780. The temporal processing also produces motion cues 424 that can be dense motion vectors that describe the movement of every pixel from one frame to adjacent frames. The motion cues 424 are used as initial motion vectors in the scene automation analyzer stage 408 and the layer conversion stage 412.

Scene Separation 404

In this stage, the source motion picture image data are divided into scenes, or shots. In describing the present invention, the terms "scene" and "shot" are interchangeable, both describing a sequence of images (or frames or image frames) or image elements of a continuous motion flow resulting from, in some embodiments, a single run of the camera. Similarly, the terms "image" "frame" and "image frame" are interchangeable. Scene separation is necessary because many IDC collection methods cannot handle abrupt changes between scenes or shots. If an edit decision list (EDL) is available, it may be used in the scene separation process. An EDL is an ordered shot list which records accurate information about every shot in a motion picture including shot length and time codes marking the start and end of each shot. If the EDL is unavailable, there are methods of identifying shots, typically with human interactions. Automated scene detection methods have been developed based on the detection of abrupt changes in image data streams. There exists a large volume of published literature on the methods of scene separation, which is not a subject of the present invention.

In order to improve process efficiency, shots representing the same scene can be grouped together so that they can be treated in a similar way throughout the conversion process. The shot grouping is part of the scene separation process, and it can be performed either by human inspection or by an automated method that searches for common characteristics that are shared by those shots. One example is to group all shots that show a "talking head" of the same person in a similar background. Similar methods can be applied to collect IDC from all the shots in the group. The scene separation stage 404 produces a shot list with shot group information 426.

Scene Layout Planning 406

Figure 5A:
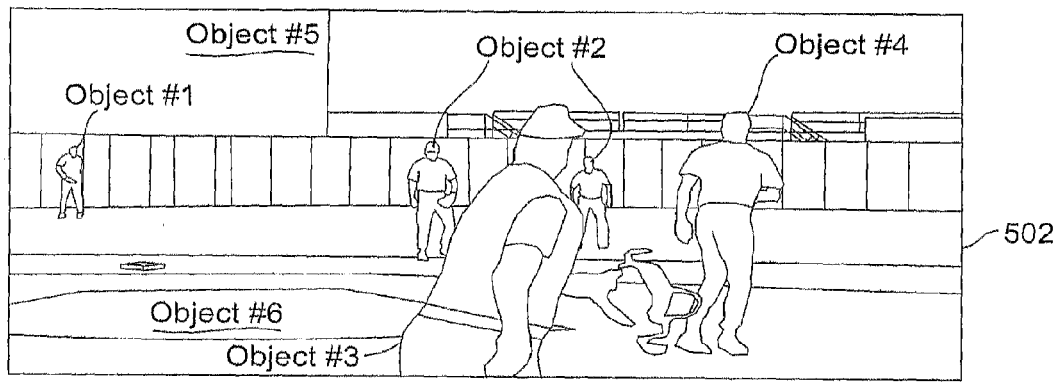
FIG. 5A illustrates an example scene layout including a source 2D image scene according to one embodiment of the present invention.
Figure 5B:
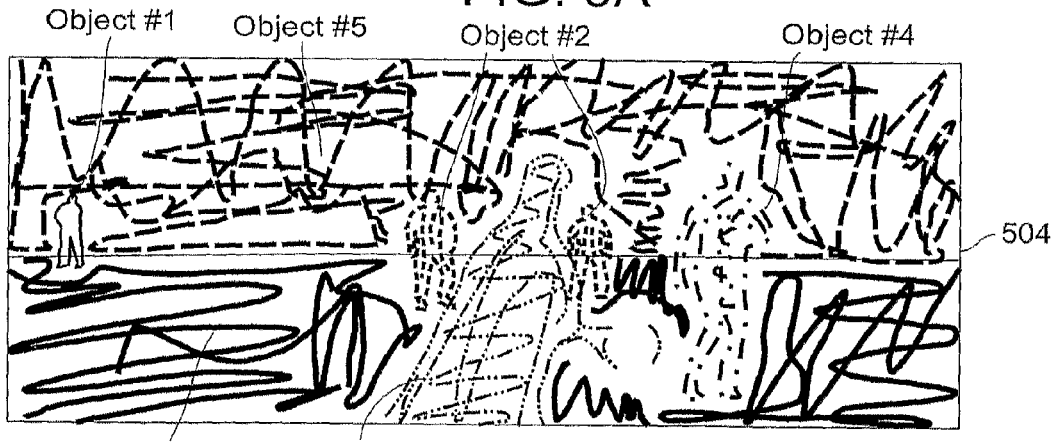
FIG. 5B is an example scene layout including an object layout according to one embodiment of the present invention.
Figure 5C:
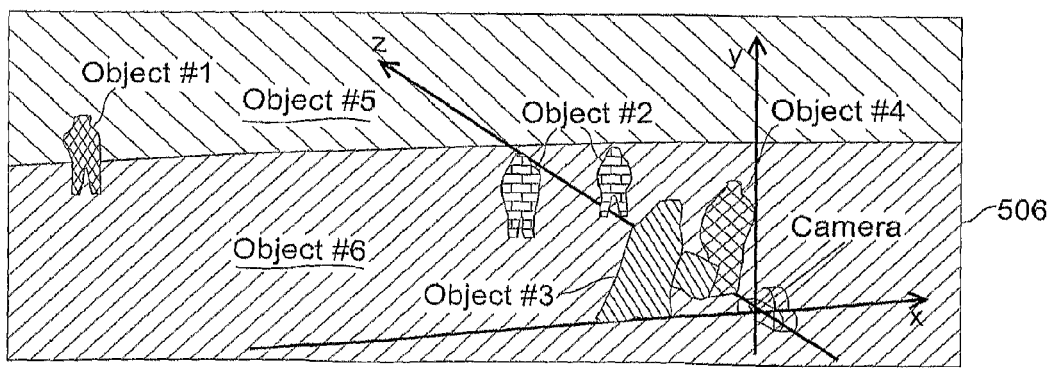
FIG. 5C is an example scene layout including a geometry layout according to one embodiment of the present invention.

In this stage, a scene layout 428 is produced for each shot. The scene layout 428 records IDC of scene geometry. In the scene layout 428, individual objects are identified and the approximate geometrical positions of the objects are defined. In some embodiments of the present invention, objects are defined based on depth discontinuity from the surroundings. FIGS. 5A-C show an example of scene layout 428. FIG. 5A shows a 2D source image shot 502 of a baseball game, including a number of objects. FIG. 5B shows a graphical description of the scene in FIG. 5A in an object layout 504, where objects in the scene are identified. FIG. 5C shows a graphical description of the scene in FIG. 5A in a geometry layout 506, where the geometrical relationships between objects are described in a three-dimensional space. Both the object layout 504 and the geometry layout 506 can be produced in a number of formats, including text descriptions, graphical descriptions or a combination of both.

In the source image 502, objects include the left field player (object #1), the shortstop and the base umpire in the center field (object #2, treated as a single object), the second umpire who is closer to the camera (object #3), the player in the right (object #4), the fence and audience seating (object #5) and the baseball field (object #6). The object layout 504 identifies all those six objects without using precise outlines. An object may contain more than one image elements, such as object #2 that contains two human shapes which are at similar distances from the camera. In general, an object may include multiple disjointed elements sharing similar characteristics, like a flock of flying birds, blowing leaves or snowflakes. An object may contain some undefined parts because it was partially blocked by another object in the foreground, such as object #2 that is partially blocked by object #3 in the selected frame. An object may disappear in some frames, such as object #1 that may move out of the scene in later frames as the camera pans to the right. The background of an image scene is also identified as one or multiple objects which are treated no differently from other objects. The background of the scene can be split into two objects: object #5, including the fence and the audience seating and object #6, the field. The object layout 504 provides the information necessary for a subsequent layer analyzer stage to produce a layer definition for each layer. In FIG. 5B, objects are assigned with distinctive colors, denoted with hashes, for the purpose of labeling object masks as described in later sections. The colors are selected from a pre-defined color palette in a specified order, The geometry layout 506 describes the scene geometry, which typically includes simple geometry models approximating object shapes, dimensions and spatial locations relative to the camera position in a three-dimensional space. In one embodiment of the present invention, a geometry layout 506 is a graphical illustration. Each object identified in the object layout 504 is modeled with an approximate shape and location in a three-dimensional space which is centered at the camera position. The horizontal axis x extends following the camera baseline in parallel with the horizontal axis of the camera image plane. The camera baseline also defines the positions of the stereoscopic 3D camera for rendering new 3D images in the subsequent layered conversion. The y-axis is usually the vertical axis or in parallel with the y-axis of the camera image plane (they axis of the image plane may not be vertical when the camera is tilted). The geometry layout 506 provides the information necessary for a subsequent layer analyzer stage to produce layer definition.

Returning to FIG. 4, a scene layout 428 is generally planned by a human operator equipped with appropriate software tools. An operator can interpret the geometry of a scene by viewing the 2D images and identify foreground objects from background objects without difficulty. An operator can also produce a more accurate estimation of the scene geometry using a depth by scaling method. The depth by scaling method is also referred to as solid depth modeling.

Scene Automation Analyzer 408

The scene automation analyzer 408 is a processing stage in which special classes of shots that are suitable for automated IDC collection methods are identified. In some embodiments of the present invention, the following scene classes 430 are identified for automated processing with assistance from the motion cues 424 generated from stage 402:

Scene class A: a shot with a dominant motion created by normal camera pan and/or tilt movements.

Scene class B: a shot with a dominant motion created by other types of camera movements including dolly, truck, zoom and/or pedestal motions.

Scene class C: a shot with a shallow depth of field resulting in foreground objects in sharp focus while background objects are blurred.

The remaining scenes are classified as scene class D, which include user interactive IDC collection methods. The above three types of scenes can be identified by a skillful human operator or by automated methods. The following automated methods may be used to identify the above three scene classes.

The automated methods generally relate to detecting dominant motion. Using the dense motion vectors 424, produced in the previous temporal analysis and enhancement stage 402, motion vectors of all pixels between a pair of adjacent frames are analyzed using a RANSAC (Random Sample Consensus) algorithm 604 in FIG. 6 to detect the existence of dominant motion homography. The RANSAC 604 first collects global motion statistics from each pair of image frames based on global homography motion models, and then detects dominant motion from global motion statistics collected from all image frame pairs by maximum votes through a voting process. If a dominant motion homography is found, the algorithm analyzes if it contains a majority of motion vectors. If the dominant motion does not contain a majority of motion vectors, the algorithm assumes that a second dominant motion homography may exist, and it searches for the next dominant motion. This search process is repeated until every dominant motion homography is found. The algorithm 604 then calculates the directions and average absolute magnitudes of the motion vectors belonging to each dominant motion homography.

Figure 6:
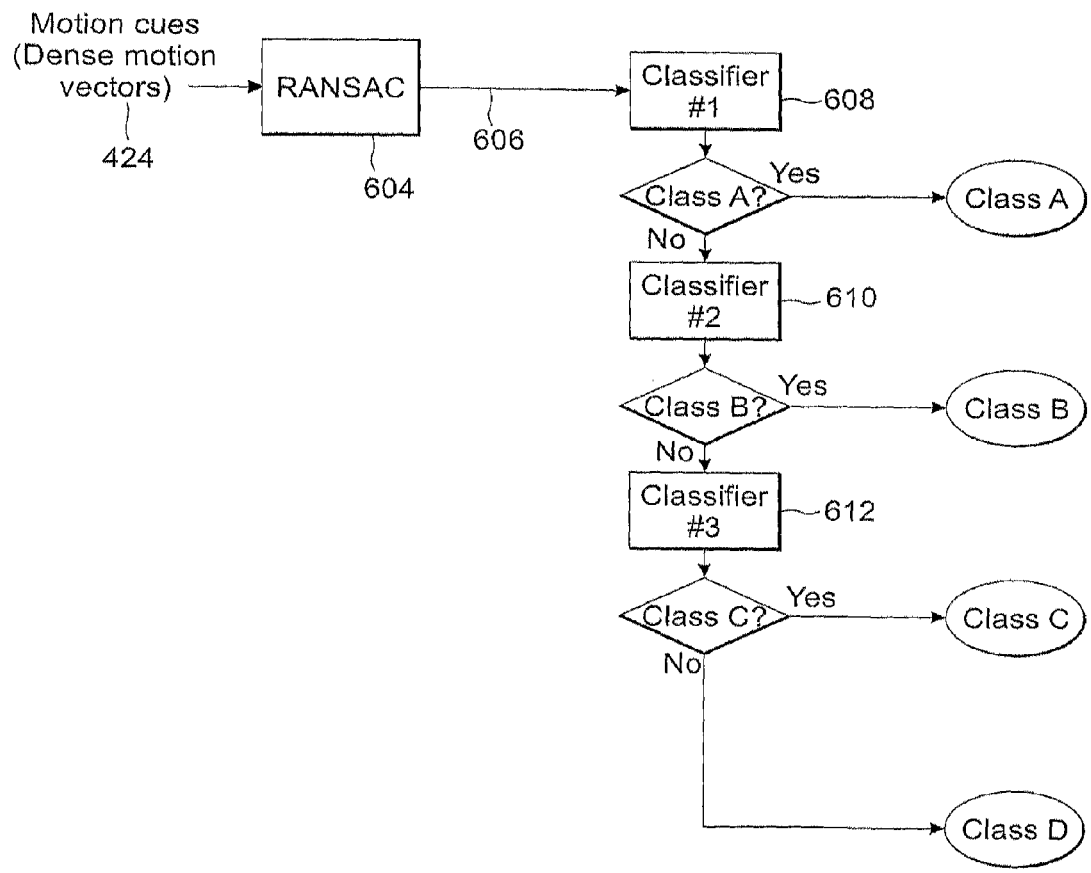
FIG. 6 illustrates a flow diagram of a scene automation analyzer decision-making process according to one embodiment of the present invention.

One embodiment of the scene classification process in the scene automation analyzer stage 408 is described in FIG. 6.

The process starts with analyzing the classified motion homography models 606 produced by the RANSAC algorithm 604. If only a single dominant motion homography is found and it contains a dominant majority of motion vectors, the image shot is a candidate for either class A or class B. The scene automation analyzer 408 further checks whether a majority of those motion vectors point to the same horizontal or vertical direction. If this is the case, the image shot is classified as scene class A, and the above decision process is referred to as classifier #1 608. If it is classified as scene class B, and the decision process is referred to as classifier #2 610.

If an image shot shows one or at most two dominant motion homography and if it not a Class A or B shot, it becomes a candidate for scene class C. The automation analyzer 408 performs a further analysis to determine whether image pixels belonging to one of the dominant motions is in sharp focus while the other pixels are blurry. For example, a check is made to determine if there is a substantial difference in the density of image feature points between those two groups of pixels. Image feature points are calculated by computing the high-order ($4^{th}$ order) central moment statistics for each pixel within a small neighborhood. The results are scaled to an 8-bit per color integer representation, and a threshold is applied to produce a map of feature points for each frame. The density of feature points between those two groups of pixels can be analyzed. Objects in sharp focus would have a much higher feature density than the blurry background. If one group of pixels has a very higher feature density while the other does not, the scene is classified as scene class C. The above methods are performed in classifier #3 612.

The automated scene classification can be visually verified by a human operator to ensure the decision is appropriate. If an image shot is considered misclassified, it is by default downgraded to scene class D. The decision-making process of FIG. 6 can be expanded if more scene classes are discovered for automated processing. In such cases, more classifiers can be added.

Layer Analyzer 410

Returning to FIG. 4, the scene level IDC collected from the above four processing stages, such as motion cues 424, shot list 426, scene layout 428 and scene classes 430, are used to facilitate the collection of more detailed and more accurate IDC at the object level. In embodiments of the present invention, a layered structure is used to describe the complexity of scenes at the object level, allowing IDC to be collected at any levels of details and accuracy. In the layered structure, objects assigned to one layer are processed independently from objects assigned to the other layers. Therefore, objects with different characteristics can be processed at different layers using different processes, and objects with similar characteristics can be processed in the same layer with the same process. Various types of IDC collected from different layers are combined later in the scene compositing stage 414. The layered structure allows various methods to be integrated into the 2D-to-3D conversion process to handle complex objects.

In the layer analyzer stage 410, objects are assigned to different layers based on characteristics. Multiple criteria are used to group image objects and elements into layers. One of those criteria is the description of object transparency. In embodiments of the present invention, a transparent object is described by multi-dimensional pixels, which permits an image pixel or a group of pixels to be shared by multiple objects. A multi-dimensional pixel may have multiple pixel values and depth values, each describing a distinctive object that can be seen at the same pixel location in the images. FIGS. 7A-B show examples of transparent objects. In FIG. 7A, certain portion of images describing the windshield object 702, including pixel P 710 at the location $(x_1, y_1)$, are shared by two other objects visible at the same location: the driver 704 and the reflection of a tree 706. As a result, pixel $P(x_1, y_1)$ 710 is the result of combined contributions from all three transparent objects, and each object may have different pixel values and different depth values at pixel $P(x_1, y_1)$ 710. For instance, the object of tree reflection 706 has a depth value at pixel $P(x_1, y_1)$ 710 corresponding to the distance 712 from the camera to the windshield, while the object of driver 704 has a different depth value at the same pixel corresponding to the distance 714 from the camera to the driver, as shown in FIG. 7B. The color of the tree reflection at pixel $P(x_1, y_1)$ 710 is different from the color of the driver's face. The layered structure provides a method of describing transparent objects. For example, pixel $P(x_1, y_1)$ 710 is defined as a multi-dimensional pixel with three sets of pixel values and depth values: (1) one representing the color and the depth of the windshield glass 702; (2) one representing the color and depth of the tree reflection 708; and (3) one representing the color and depth of the driver's face 704. Each object is represented at a distinctive layer in a layered structure, and the multi-dimensional pixel $P(x_1, y_1)$ 710 is split among those three layers with each layer having one set of pixel value and depth value corresponding to the object represented by the layer. The layered structure allows each transparent object be processed independently from other objects. After all three objects are converted to 3D through a process that will be described in the following sections, the re-constructed versions of each multi-dimensional pixel at different layers may be mapped to different locations because of difference in depth values. The results from those three layers and those re-constructed versions from different layers are later combined to form 3D images. Such a result is a realistic representation of real world appearances in that pixels representing multiple objects are separated from a different viewing angle. The example of FIGS. 7A-B may not be easily described within a single layer. The same method can be used to describe translucent and reflective image objects such as mist, clouds, fire and reflections.

Reconstruction of objects with occlusion is another criterion for layer separation. The layered structure provides a method of reconstruction of missing portions of objects. An object may be partially blocked, or occluded, by other objects in the foreground, but the occluded regions may be revealed when the images are reconstructed from a different viewpoint. There is no immediate information in the occluded regions from the original images, but the missing information may be recovered from the other frames of the image sequence. The layered structure allows all frames of an occluded object be stored in a specific layer so that reconstruction is performed within the layer and independently from other layers. The layered structure also allows the re-constructed objects be represented in multiple layers in a similar way as the multi-dimensional pixels so that the occluded regions can be filled when the results from different layers are combined.

Figure 8:
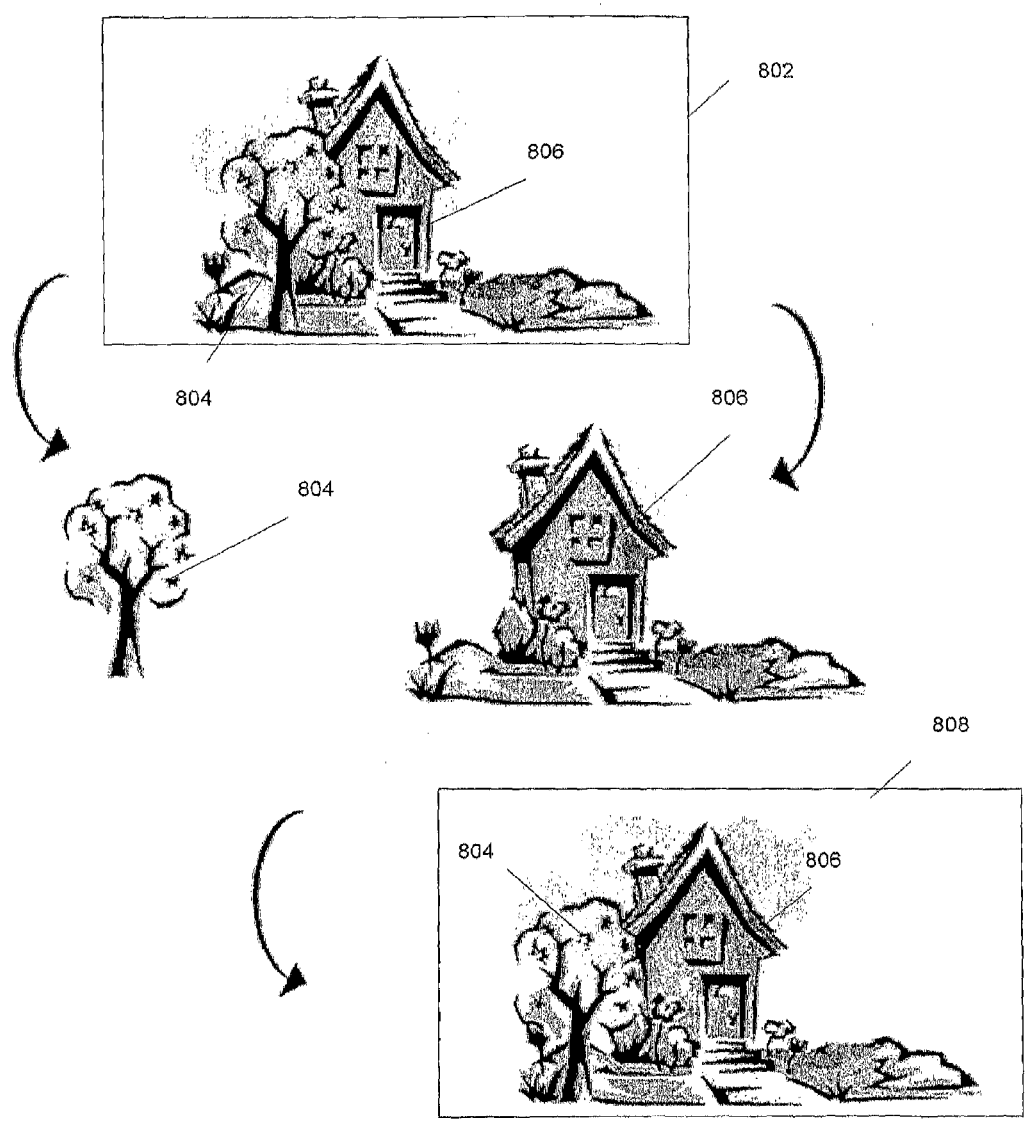
FIG. 8 illustrates a layered reconstruction of missing portion of objects according to one embodiment of the present invention.

One embodiment of this process is depicted in FIG. 8. A frame 802 from a 2D image sequence includes a background object that is a house 806, occluded by a foreground object that is a tree 804. In order to reconstruct the house 806, the tree object 804 is separated from the image 802 as well as from all the other frames from the image sequence. The image frames containing the house 806 as the remaining background object are saved in one layer, separated from the tree object 804 which is represented in another layer. If the missing part of the background object is revealed in other image frames due to camera motion, the missing pixels can be tracked, transformed and reproduced so that the house 806 can be reconstructed within the layer. Both objects 804, 806 are computed from a new camera view and the results are combined to form a new image 808 in which the occluded part of the house 806 is filled with reconstructed information. Some embodiments of the reconstruction of occluded objects method will be described in detail in later sections.

Automated object separation is another method used in some embodiments of the present invention. The layered structure provides a method of separating objects in image shots with a shallow depth of field (DOF). In such a shot, main objects are in sharp focus while the other objects are blurry because they are outside the DOF. Objects that are in focus can be assigned to a layer separated from the blurry images so that they can be separated automatically, for example, shots classified as scene class C.

Particle objects are used in some embodiments of the present invention. A particle object can contain many irregular elements, like snow flakes, rain drops, blowing leaves, plankton in the ocean or water bubbles. In the layered structure, a large number of similar irregular elements are collectively defined as a single object and represented in a single layer. As a result, the geometry of those elements can be defined by a single depth model within the assigned layer and all the elements belonging to the object can be processed simultaneously within the layer.

Object size compensation is used in some embodiments of the present invention. Miniaturizing in stereoscopic vision may result from size-distance laws in which the perceived size of an object diminishes when it moves closer to a viewer. In stereoscopic vision, the perceived distance of an object is determined by the horizontal disparity of its images in left and right images, which is referred to as parallax. When the parallax increases, the object is perceived closer to a viewer, but the apparent size of the object is perceived to decrease. Reverse miniaturizing can also occur when the parallax is reduced and the object appears to move away from a viewer but it also appears bigger. The effect of miniaturizing or its reverse is contradictory to real life experience and it may not be acceptable to the audience. One solution is to digitally scale the size of the object in the images before 3D images are computed in order to compensate for miniaturizing or reverse miniaturizing. When an object is perceived to be miniaturized, it can be scaled up using an up-sampling method to compensate. The scaling factor is calculated based on the level of miniaturization that can be estimated by applying size-distance laws. The scaling factor can vary from frame to frame if the object changes its distance throughout the image shot. With a layered structure, objects that require size compensation are assigned to a separate layer so that they can be scaled in a similar way.

Motion classification is also used in some embodiments of the present invention. The layered structure provides a method of processing objects with different motion characteristics. Objects in a scene can be classified into a number of classes based on their motion characteristics. One example is to classify objects into the following five classes:

Object Class 0: still or with very small motion;
Object Class 1: with dominant camera motion;
Object Class 2: moving towards or away from camera;
Object Class 3: moderate motion with no significant motion blur; and
Object Class 4: all the others.

Objects classified into the same class can be assigned to the same layer so that special processing methods can be applied to the layer. In some cases, such as a scene class A shot or a class B shot, the entire shot is treated as a single object of class 1, so that it can be processed in a totally automated mode.

The decisions of object layer assignment and object classifications by the layer analyzer stage 410 are stored by a data record referred to as layer definition. Generally, there is one layer definition for each layer. For the kth layer, for example, the layer definition records the objects assigned to the kth layer in a form similar to the scene object layout 504. It also defines the geometrical relationship between the objects in the kth layer in a form similar to the scene geometry layout 506. The layer definition also defines the estimated dimension for each object in the layer as well as its depth range in order to avoid potential conflict with other layers. The scene classes and object classes are also recorded in the layer definition.

Layered Conversion 412

Figure 9:
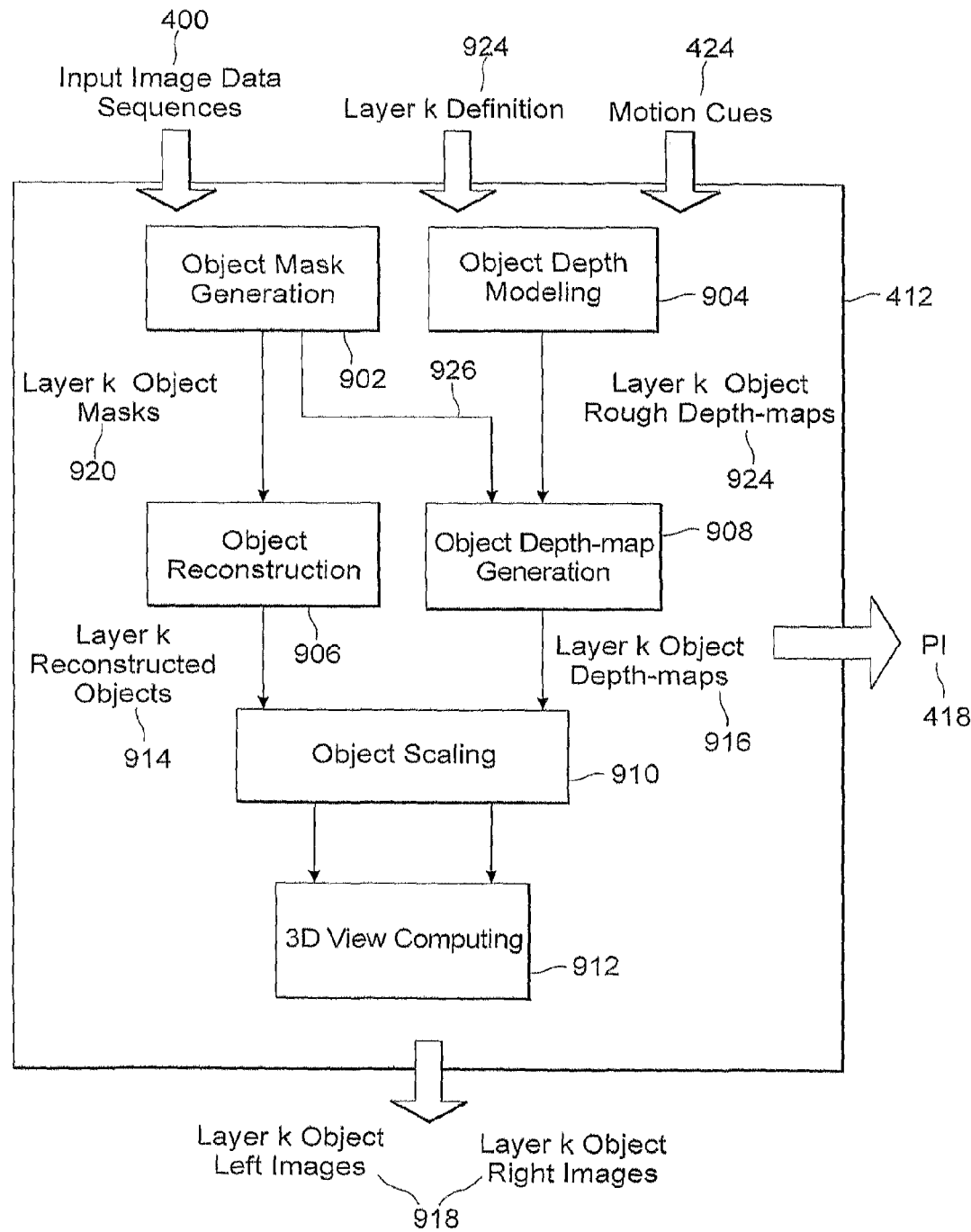
FIG. 9 illustrates a flow diagram of an image data cues collection process in a single layer of a layer conversion stage according to one embodiment of the present invention.

One function of the layered conversion stage 412 is to collect detailed and accurate IDC at the object level and produce left and right images of all objects based on the collected IDC. Various types of IDC are collected from objects assigned to a layer by multiple processing modules. FIG. 9 shows one embodiment of a process flow diagram of a single layer including multiple processing modules. The multiple processing modules can include an object mask generation module 902, an object depth modeling module 904, an object reconstruction module 906, an object depth map generation module 908, an object scaling module 910, and a 3D view computing module 912.

One function of the object mask generation module 902 is to produce object masks 920 that describe each object defined in a layer definition information 924 in every frame. An object mask defines a shape, and all pixels included in the object mask have color information. An object mask may contain blank regions without proper color information. For example, an object that is partially occluded by another foreground object so that the occluded part of the object has no color information. When the object is converted to left or right images, the blank regions remaining in the new images are called occlusion regions. Although the occlusion regions can be filled with proper information in the scene finishing stage 416, the process is usually tedious and costly. In many cases, the missing information is revealed from other frames of the image shot as the result of object or camera motion. In those cases, the blank regions can be reconstructed by motion tracking and image registration. The object reconstruction module 906 performs the task of tracking and recovery of the missing information wherever possible. Both object masks and reconstructed objects are types of IDC.

Other types of IDC include depth cues of an object. The depth cues are not directly available from 2D images, but they may be estimated in some cases or approximately modeled in other cases. The object depth modeling module 904 produces an object depth model, which is an approximation of the geometrical shape of the object. A depth model is required to match the movement and deformation of the object throughout the image shot. A depth model can be created without precise object contour information, so that the object depth modeling 904 can be carried out in parallel with the process of object mask generation 902. Each resulting depth model is then matched to the precise object masks of the same object generated from the object mask generation module 902. Object masks that are paired with depth models are used to produce accurate object depth maps 916. producing object depth maps 916 can be performed by the object depth map generation module 908.

With reconstructed objects 914 and their corresponding object depth maps 916, the left and right images of objects can be computed. However, if object scaling is required, the objects and their corresponding object depth maps 916 must be scaled by the same factor. Object scaling is performed by the object scaling module 910. The scaled objects and the scaled object depth maps are used to compute the left and right images 918 of the object by the 3D view computing module 912. The computed 3D images can be verified and, if accepted, the IDC collected, including detailed object masks, detailed object depth maps, reconstructed objects together with render scripts, render parameters and other necessary data from all processing modules, is saved as RDR for the specified layer. Processing module details according to some embodiments of the present invention are disclosed in the following sections.

Object Mask Generation Module 902

One function of the object mask generation module 902 is to generate object masks that define the contour of each object defined in layer definition information 924. Because an object is defined for the entire image shot, the precise object masks are created for every image frame of the shot wherever the object is present. If an object consists of multiple disjointed elements, the object masks will contain multiple disconnected segments for all applicable frames. The object masks are usually created at the same image resolution as the original images.

Figure 10:
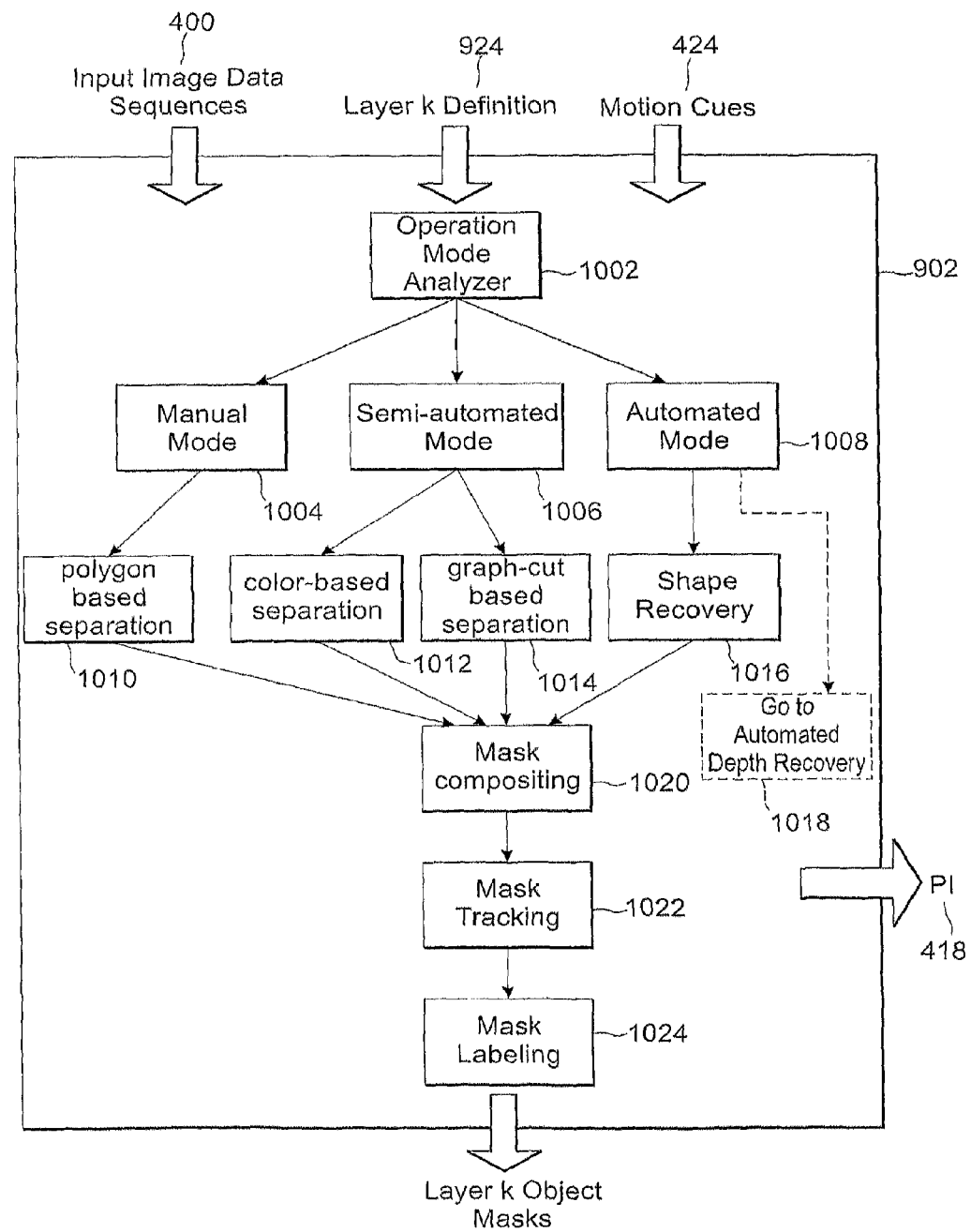
FIG. 10 illustrates a flow diagram of an object mask generation module according to one embodiment of the present invention.

FIG. 10 is a process flow diagram of one embodiment of the object mask generation module 902. A plurality of methods of mask generation may be deployed, each belonging to one of the three operation modes: automated mode 1008, semi-automated mode 1006, and manual mode 1004. An operation mode analyzer 1002 determines an appropriate method for each object by analyzing the motion class of each object and its background objects and other image characteristics. In one embodiment of the present invention, five methods are deployed. These methods include polygon based separation 1010, color-based separation 1012, graph-cut based separation 1014, and shape recovery 1016, and automated depth recovery 1018. The operation mode analyzer 1002 may decide to use more than one method and combine the results through mask compositing 1020. The operation mode analyzer 1002 also determines whether precise object masks are produced only for key frames and whether mask tracking 1022 is needed to produce masks for frames in between key frames.

The multi-mode structure of the object mask generation module 902 ensures more automated methods and semi-automated methods can be easily integrated into the present invention to improve process efficiency as technology progresses. The same computing structure is shared by the object depth modeling module as well as the scene finishing stage.

Operation Mode Analyzer 1002

The operation mode analyzer 1002 selects an appropriate operation mode for each object. First, it checks the motion class of an object. For a class 1 object, its depth maps may be computed directly by the automated depth recovery method 1018, implemented in the object depth generation module 908 in FIG. 9. The class 1 object can bypass the object mask generation module completely and no object masks are created. Such a bypass path 926.

If the object is classified as class 0, the operation mode analyzer 1002 performs a subsequent analysis to determine if the object is in sharp focus while its background objects are blurry. This is done by determining if there is a substantial difference in feature density between the object and its background. Objects in sharp focus have a much higher feature density than those that are out of focus. If an object is in sharp focus while its background objects are not, the object masks can be generated by the automated shape recovery method 1016.

For remaining types of objects, some forms of user interactions may be needed for producing precise object masks. Semi-automated separation mode 1006 includes methods by which object masks are produced without directly specifying points on the boundaries. Multiple semi-automated separation methods may be implemented. In one embodiment of the present invention, two semi-automated methods are implemented, including a color-based separation method 1012 and a graph-cuts based separation method 1014. The operation mode analyzer 1002 first computes the color statistics of an object. If the object has a relative uniform range of colors with only small variations and if the object colors are significantly different from background colors, it can be separated by the color-based separation method 1012. If the object has large color variations but still significantly different from background colors, it can be separated by the graph-cuts based separation method 1014. For other cases, a polygon-based separation method 1010 can be used. Although the polygon-based separation method is flexible, it is generally a manual operation. The operation mode analyzer 1002 may also choose to use more than one method for separation and to combine the results from different methods at the mask compositing module 1020.

Another function of the operation mode analyzer 1002 is to analyze the motion fields of an object to determine if keyframing is needed and the exact key frame positions in a shot for each object. Key frames are selected to mark abrupt changes in object motion and the motion between key frames is supposed to be smooth. With key frames defined, precise object masks are produced only at key frames by one or multiple mask separation methods, and the object masks for other frames in between key frames are produced through mask tracking 1022.

Shape Recovery 1016

In some embodiments of the present invention, shape recovery 1016 is the only automated separation method deployed. In shape recovery 1016, object shapes are calculated based on differences in focus. This method applies to a class 0 object that is in sharp focus while its background objects are blurry. The first step of shape recovery 1016 is to compute a feature mask map for an object with surrounding background objects for each frame. The method of computing a feature mask was described previously for identifying scene class C at the scene automation analyzer stage 408. Because a class 1 object has a much higher feature density, object masks are created by repetitive applications of a morphological reconstruction closing filter followed by a morphological reconstruction opening filter to the feature mask maps. If the resulting object masks are not sufficiently precise, the object should be re-assigned to a semi-automated mode.

Color Based Separation 1012

In this semi-automated method, object masks are defined based on color differences. A user selects certain color values as thresholds that separate object pixels from the background. This method is commonly referred as "color keying" or "chroma keying" and is widely supported by many graphics software applications. In color based separation 1012, selected color values are relative to the source image data, so that the results are color-independent and repeatable when the source image data has color changes. Color based separation methods 1012 is a gradual refinement process in which users need to refine the selection of color values until precise object masks are generated. Certain embodiments of the color based separation methods 1012 are more suitable for objects with a relative uniform range of colors that are very different from background colors.

Graph-Cuts Based Separation 1014

The graph-cuts based separation method 1014 is a semi-automated method in which users specify "seeds" for both inside and outside the object to be separated. Like a color based separation method, the graph-cuts separation method 1014 is more suitable for objects whose colors are different from background colors. Typically user input is through a GUI environment. In one embodiment, users draw a set of free-hand lines, strokes or polygon shapes to mark the interior of an object to be separated and another set of freed-hand lines, strokes or polygon shapes to mark background objects. Those two sets of lines, strokes and shapes form the "seeds" and they are usually marked with different colors. Those "seeds" may be required only at key frames, and the "seeds" needed for the frames in between key frames are interpolated from key frame "seeds."

Once the required two sets of "seeds" are drawn, a graph cuts algorithm will separate the object automatically. If the resulting object masks are not precise enough, a user will add more "seeds" near problematic portions of the masks and repeat the algorithm until required precision is achieved. Certain embodiments of the present invention use an improved graph cuts based separation method. Improved graph cuts based separation methods may be understood with a discussion of original (unimproved) graph cuts algorithms.

The original graph-cuts algorithms are designed to minimize an energy function E among all possible labels. The approach is to define two special terminal nodes, one called source and another called sink. A graph-cuts result is a partition of all non-terminal nodes with some connected to the source while others connected to the sink. The best graph-cuts are achieved when the energy function E is minimized. To apply the original graph-cuts algorithms for separating an object from the background, all pixels in an image are defined as a set V with each pixel being regarded as a node in set V. Each pixel forms a pair with a neighbor pixel in a 4-neighbor neighborhood, and all pixel pairs form another set E with each pixel pair as a node in set E. The color of pixel i is defined as the value C(i) of the node i, and each node i also has a label x(i) with x(i)=0 representing the background and or x(i)=1 representing the object. Initially, a user defines two sets of "seeds": one set of seeds representing the object and the other representing the background. The "seeds" do not need to be located on the object contour but they need to cover a representative color range of the object, or the background. With the "seeds" defined by the user, image pixels are partitioned into three sets: those belong to the object F, those belong to the background B, and those undefined U. This step is known in the art.

The next step is to collect all pixels in set F, perform cluster analysis in set F and divide the set into a number of subclasses. The average color of all subclasses are calculated and used as the representative colors of set F, the object. The same process is repeated to calculate the representative colors of B. Then for each node i in the undefined set U, compute the minimum color difference with the representative colors of F as d(i,F) and the minimum color difference with the representative colors of B as d(i,B). Define a first energy term $E_1$ as:

$$E_1(x(i) = 0) = \begin{cases} inf & i \in F \\ 0 & i \in B \\ \frac{d(i, B)}{d(i, B) + d(i, F)} & i \in U \end{cases}$$

$$E_1(x(i) = 1) = \begin{cases} 0 & i \in F \\ inf & i \in B \\ \frac{d(i, F)}{d(i, F) + d(i, B)} & i \in U \end{cases}.$$

For the set consisting of all pixel pairs, each node is a pair of pixels (i, j), and a second energy term $E_2$ is defined in set U as:

$$E_2(x(i), x(j)) = |x(i) - x(j)| \frac{1}{1 + \|C(i) - C(j)\|},$$

where $\|C(i)-(j)\|$ is the absolute color difference of pixels i and j. An energy function E(X) is constructed from $E_1$ and $E_2$ as:

$$E(X) = \sum_{i \in V} E_1(x(i)) + \lambda \sum_{(i,j) \in E} E_2(x(i), x(j)).$$

The original graph-cuts algorithm finds the best partition of pixels (nodes) that minimizes the energy function E(X) and, as a result, separates the object from the backgrounds. If the resulting object masks are not precise enough, more "seeds" can be added near problematic areas, which update the set F and B. The process is repeated until the results are satisfactory.

Improved graph-cut based separation methods according to some embodiments, includes a double-pass object mask generation method based on graph-cuts algorithms. The double-pass object mask generation method reduces the required computing time while maintaining sufficient accuracy. In the first pass, the images are first segmented into regions using a color-based segmentation algorithm, such as, for example, a "Watershed" algorithm or a "Meanshift" algorithm. The segmented regions replace pixels as the nodes that form set V. Each pair of neighboring regions replaces pixel pairs as the nodes that form set E. The average color of each segmented region is defined as the color of the node C(i). With those changes, the energy functions $E_1$, $E_2$ and E(X) can be defined in the same way, so that the graph-cuts algorithm can be used to separate segmented regions into either the object or the background. The result from the first pass is a rough object mask that needs further refined in the second pass.

The second pass refines rough object masks by applying graph-cuts algorithms at pixel level on edge pixels that separate foreground and background regions. The edge pixels are those that are located on or near the edges of rough object masks, and they are redefined as nodes in set U. The remaining pixels will keep their labels from the first pass as nodes either in set F or in set B. The energy function E(X) is defined based on sets F, B and U in the same way as descried previously. The graph-cuts based separation methods 1014 are applied to further partition undefined edge pixels into either the object or the background.

Polygon Based Separation 1010

Using computer software that supports a GUI environment, a user produces an object mask by manually defining a closed polygonal shape with the vertexes of the polygon located precisely on the perceived object contour. This process, also referred to as rotoscoping. The object mask generation module includes the polygon based separation method 1010 as one of the user-assisted methods.

Mask Compositing 1020

In some cases, object masks may need to be created using more than one separation method, because one method may produce precise results only in a certain portion of the mask while another method may work better in another portion of the mask. Mask compositing 1020 is a process that combines the results from different methods to form a precise object mask. This process can be implemented using software with a GUI environment so that a user can use set logical operations, such as AND and OR, to select the best portions of the mask from a set of masks and combine them into a precise final result.

Mask Tracking 1022

Mask Tracking 1022 can be used if the combined object masks are created at key frames. Mask tracking 1022 predicts object masks for the frames in between two key frames. Because the precise movement of the object from one key frame to the next key frame is known, motion tracking can focus on pixels near the edges of the mask. Unlike most of key frame interpolation methods that require correspondence of mask boundary control points between two key frames, some methods do not require such a correspondence.

For objects that have heavy texture around their edges, the following method is used with five different motion models: translation, affine, projective, quadratic and piecewise spline. Starting with a precise object mask at a key frame, a narrow band inside the mask boundary is created by subtracting from a smaller shape from the mask by applying a morphological erosion to the mask. The features inside the band are extracted and used for tracking. The feature points inside the band are tracked to the next second frame. Based on correspondence of feature points between two the frames, the closest motion model among all five-motion models is selected as the motion transformation model. The mask for the second frame is created by applying the selected motion model to all the boundary points of the mask at the key frame. The resulting mask is refined using local warping, in which the boundary of the mask is divided into a number of segments of equal arc length. The tracked features within each segment are used to re-calculate local motion transform model, and the resulting model is subsequently used to refine the boundary of the segment. This process is repeated for all the segments until the entire boundary of the mask of the second frame is refined. Any discontinuity between segments needs to be smoothed. Once the second frame mask is completed, it is used for creating the mask for the next third frame and the process may be repeated as needed.

For objects that do not have adequate texture near the edges, another tracking method is used based on global motion. The idea is to compute the global motion of feature points inside the object mask in a key frame and track their movement to subsequent frames towards the next key frame. Any feature point that disappears during the course is considered a bad feature, and any feature that moves to the outside of the mask is also considered a bad feature. After all bad feature points are removed, a set of good feature points is obtained, which is called forward feature points. Repeat the same process from the second key frame backwards to the first key frame and another set of good feature points is obtained, which is called backward feature points. The global motion of each frame is estimated by calculating the center of all good features (both forward and backward feature points) in the frame.

The next step is to calculate local motion for each node of the object mask. Nodes of the object mask can be control points created during polygon-based separation mode 1010, or be calculated from mask boundary using other methods, such as the Douglas-Peucker algorithm. The features that fall into a neighborhood of the node are analyzed and the local global motion is obtained from those features. If there are no features in a local area, the global motion is used for the node. For every frame in between those key frames, the corresponding interpolation coefficients are computed based on local global motion. A new object mask is created based on the interpolation coefficients at each frame in between key frames. The results from this method are substantially more accurate than typical linear interpolation based on node correspondence as implemented in most of commercial software tools today.

Mask Labeling 1024

Figure 11A:
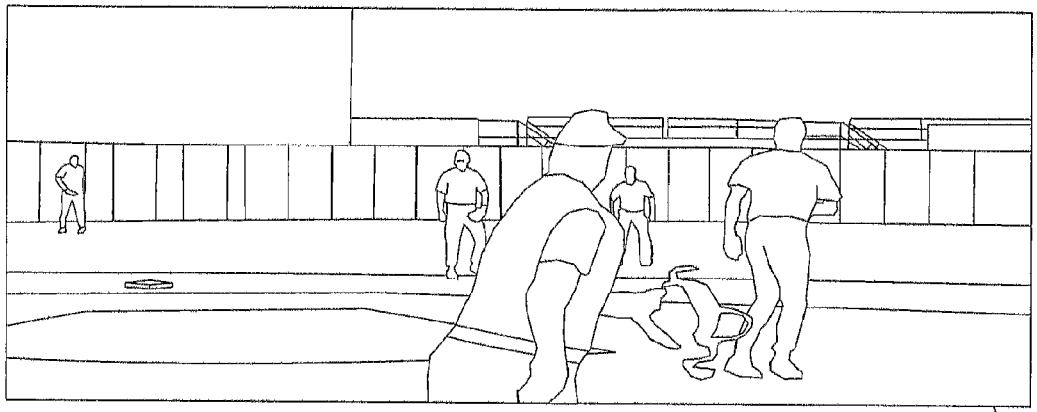
FIG. 11A illustrates an example of a source 2D image sequence before assigning a object masks according to one embodiment of the present invention.
Figure 11B:
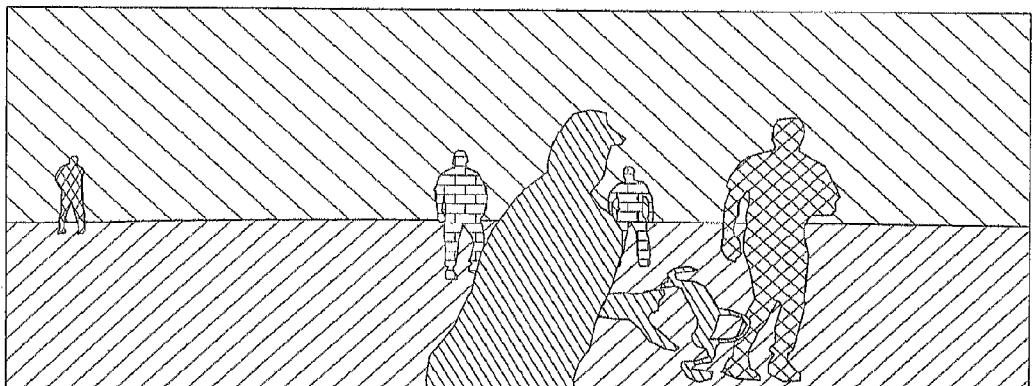
FIG. 11B illustrates an example of the image of FIG. 11A with assigned and labeled object masks.

In mask labeling 1024, object masks are labeled with the same color label, shown with hash marks, as defined in the scene layout example shown in FIG. 5B. As a result, all object masks of an image shot can be combined in an object mask image sequence in which masks of the same object are marked with a unique color. The result is shown in FIGS. 11A-B, in which the 2D source image example 1102 is the same one as used in FIG. 5A. The color labeled object mask image sequence 1104 in FIG. 11A shows that each object is assigned with the same color label as defined in the object layout 504 in FIG. 5B. The color labeled object mask image sequence is used in the subsequent object depth map generation module 908 for refining object depth maps.

Object Depth Modeling Module 904

Returning again to FIG. 9, one function of the object depth modeling module 904 is to give each pixel of an object a depth value. The main concept is to approximate the three-dimensional shape of an object with a graphical model in real-world dimensions. The depth values can be calculated from the position of a pixel on the surface of the depth model to the position of the camera. In special cases, however, depth values can be directly calculated from scene motion cues in an automated mode.

One distinction between the depth modeling method of certain embodiments of the present invention and some other known methods of assigning depth values is that depth models, according to some embodiments of the present invention, do not define object contour. For example, the depth model of an object is not required to match object contour precisely. However, it is desirable that the depth model enclose the contour of an object. This distinction allows depth modeling to be performed based only on approximate object descriptions defined in the layer definition. As a result, the functions of object depth modeling module 904 can be performed independently from the functions of the object mask generation module 902, with some exceptions, and, can be performed in parallel with object mask generation.

Figure 12:
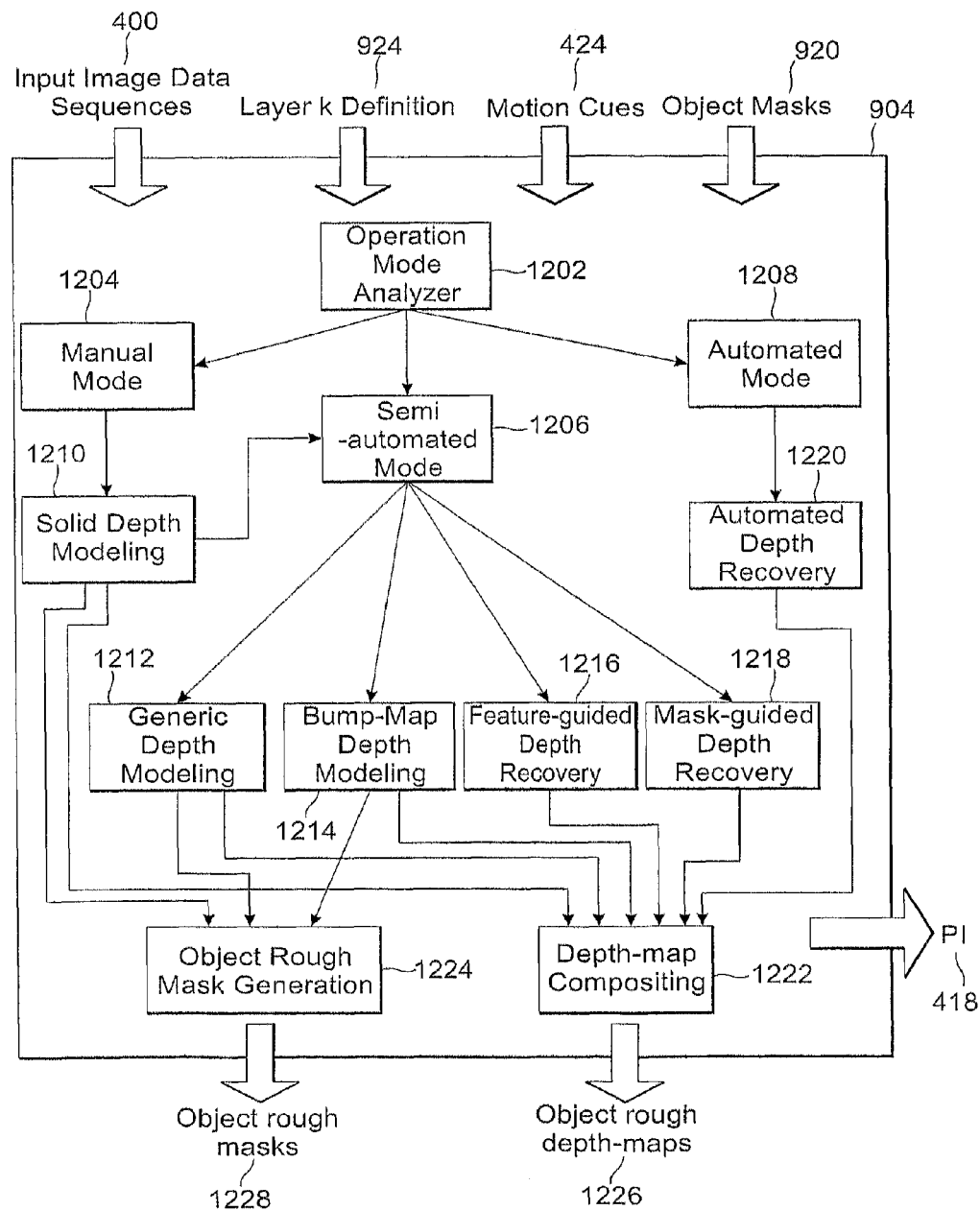
FIG. 12 illustrates a flow diagram of an object depth modeling module according to one embodiment of the present invention.

FIG. 12 shows a process flow diagram of one embodiment of the object depth modeling module 904, which has a multi-mode structure similar to that of the object mask generation module 902. As depicted in FIG. 12, one automated mode 1208, four semi-automated modes 1206, and one manual mode 1204 may be employed. The automated mode 1208 may include automated depth recovery 1220. The semi-automated mode 1206 may include generic depth modeling 1212, bump-map depth modeling 1214, feature-guided depth recovery 1216, and mask-guided depth recovery 1218. The manual mode 1204 may include a solid depth modeling method Operation Mode Analyzer 1202

The operation mode analyzer 1202 can select an operation mode for an object based on its motion class. In addition, the operation mode analyzer 1202 also determines if the object is a generic object. A generic object can be represented by a more universal generic depth model. One example of a generic object is a close-up of a person's face while talking, or a "talking head," which is very commonplace in a motion picture. Because human faces share similar shape, a "talking head" can be approximated by a generic head model that can be used for other human faces. Another example of a generic object is a car model that can be used to approximate other types of cars. One requirement for a generic model is that it can be scaled and animated to follow the motion of a variety of object that it may represent.

If an object is considered a generic object, the operation mode analyzer 1202 assigns the object to the generic depth modeling method 1212. Otherwise, it analyzes the motion class of an object to determine the method to apply. If the object is a class 1 object, it is assigned to the automated depth recovery method 1220. If the results from the automated depth recovery 1220 are not satisfactory, the object will be assigned to one of semi-automated depth recovery methods 1206.

Solid Depth Modeling 1210

The solid depth modeling method 1210 is selected for an object that cannot take advantage of either an automated mode or a semi-automated mode. Based on real-world object dimensions defined in the layer definition, a depth model is created for each object using a modeling software tool, such as Maya produced by Alias. In certain embodiments of the present invention, the process has a number of differences from conventional processes. For example, a depth model encloses the object, but does not need to match the precise boundary of the object. In addition, depth modeling does not require the creation of full geometrical details. Furthermore, the depth model matches the movement of the object in a scene, which can be achieved by animating the camera or by animating the object or by doing both. The quality of animation is not important. As a result, modeling of depth is a simpler process than conventional solid modeling processes.

In certain embodiments of the present invention, the estimation of real-world dimensions and depth of objects is performed using a depth by scaling method. In some embodiments of the present invention, depth by scaling is implemented in a software tool that is capable of constructing a virtual three-dimensional environment in which a virtual camera can be placed to capture images of the environment on a 2D image plane from the viewpoint of the camera. The software provides a plane situated within the three-dimensional environment, viewed by the camera, and the 2D image sequence that is to be converted to 3D can be attached, like a virtual billboard, to the image plane. The software is also capable of creating three-dimensional models and placing them in the three-dimensional environment. The movement of the models and the virtual camera can be animated by a user.

A virtual camera is a mathematical model of the image formation function of a physical camera. A virtual camera is described by a set of parameters, including lens focal length, field of view and additional lens characteristics. A virtual camera can be implemented by software in a calibrated three-dimensional virtual environment.

Figure 15:
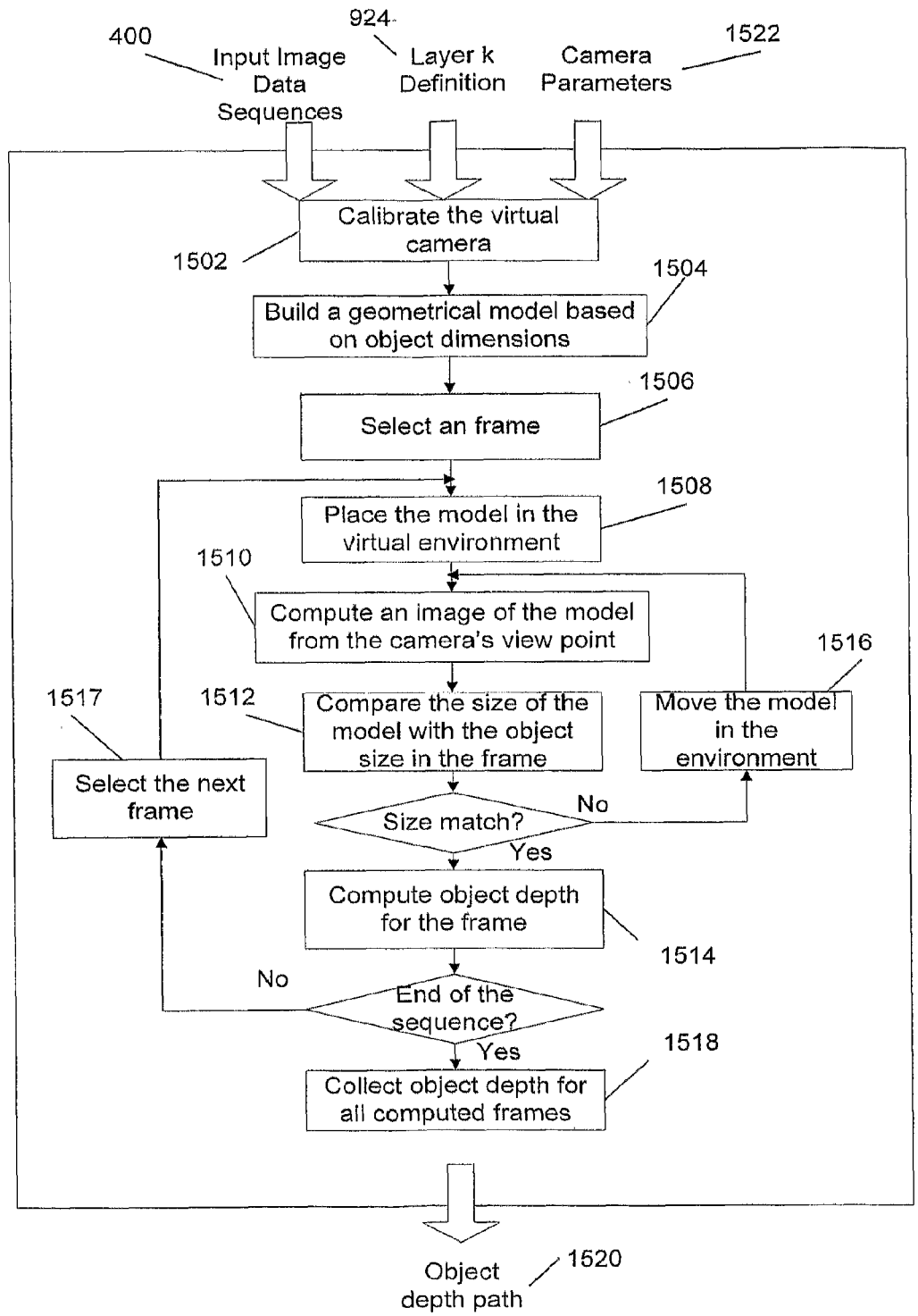
FIG. 15 illustrates a flow diagraph of a depth by scaling method according to one embodiment of the present invention.

One embodiment of the depth by scaling method is described in a flow chart in FIG. 15. Camera parameters 1522 are received and used to calibrate the virtual camera 1502. To determine the depth of an object in the 2D image sequence, the real-world dimension of the object, such as layer definition 924 is received. For instance the layer definition 924 may include a person that has a height of 5 feet and 10 inches and an automobile that has a length of 5 meters or a width of 2 meters. To estimate the depth of such an object, a geometrical model that matches at least one real-world dimension of the object is built within the virtual environment at step 1504. An operator selects a frame of the 2D image sequence at step 1506 that contains the object and places the geometrical model with the object dimension at the position of the object in the frame within the virtual environment at step 1508. At step 1510, an image of the model through the calibrated virtual camera is computed. The operator can check if the size of the computed model image matches the dimension of the object by comparing the size of the model with the object size in the frame at step 1512. If the size does not match, the operator then moves the model towards or away from the virtual camera in step 1516 and re-computes the image of the model in step 1510 until it matches the size of the object in the 2D image frame. The resulting location of the model provides a good estimate of the real-world position of the object. The user then computes the depth of the object for the selected frame in step 1518. This process may be repeated for a sufficient number of key frames in the image sequence by selecting the next frame in step 1517 until the depth of the object is established for the entire sequence and collected at step 1518. The depth path of the object for the entire sequence is then outputted at step 1520, which can be used for depth modeling and animation. If a layer contains more than one object, the process described in FIG. 15 can be repeated for every object assigned to the layer until the depth paths of all objects are estimated.

The final step of the solid depth modeling is to compute a depth map from the depth model for every frame. Since the depth model does not match the precise object boundary, the resulting depth map sequence is called a rough object depth map sequence or a rough object depth map. The rough depth map can be used as the generic model for the next method, generic depth modeling 1212.

Generic Depth Modeling 1212

For a generic object, an appropriate generic model is selected from a predefined generic model library or created using the solid depth modeling 1210 process. The generic model is scaled and animated to match the motion of the object. This process is known as "matchmove," and can be performed through automated, semi-automated or manual methods. In some embodiments of the present invention, matchmove is accomplished using feature matching. A set of features are predefined for each generic model in the library, and those features are selected because they are easily identifiable and traceable from images. In the example of "talking heads", typical features used are facial features, such as corner points from eyes, lips, nose, eyebrows and ears. A user identifies those feature points from object images at some key frames, and the user tracks the precise locations of the feature points in every frame with the assistance of software. The precise feature points located in each frame are mapped to the features of the generic model, and a corresponding three-dimensional transformation is calculated. With the three-dimensional transformations as an animation path, the animated generic model becomes the depth model of the generic object.

An object depth map can be extracted from a depth model by calculating the Z-depth of every pixel of the depth model for every frame as descried previously. The resulting rough object depth map can be refined by the object depth map generation module 908.

Automated Depth Recovery 1220

For class 1 objects whose motion is the result of camera movement, it is possible to recover depth values directly from pixel motion. There may be no need for object masks because depth discontinuity can be calculated from motion differences. A typical class 1 object usually includes both foreground and background image elements used to in depth recovery.

The simplest camera movement is a pan or tilt, which results in direct correspondence between depth and motion. For more complex camera movements, the camera movement is deducted from pixel motion in order to establish depth-motion correspondence. The detection of camera motion starts with feature detection and tracking. Object features are selected automatically from each frame and tracked to neighboring frames. The features are classified based on their motion in a similar way as described in the previous section describing the scene automation analyzer 408. One difference may be that the scene automation analyzer 408 uses all motion vectors, but only feature motion vectors are used in depth recovery 1220. A planar-based motion model called homography is used for each motion class. Features classified into the same motion class share the same motion homography model. The camera motion is detected from dominant homography models. The camera motion is then obtained from pixel motion, and the resulting "pure" pixel motion has correspondence with object depth. Depth value of each pixel of an object can directly be computed from such "pure" pixel motion cues. The resulting depth values are filtered using a low-pass filter to remove spatial errors. The temporal errors of the resulting depth values can be reduced through temporal filtering, similar to the method deployed in the temporal analysis & enhancement stage 402. The depth values that are both spatially and temporally filtered form rough depth maps.

Feature-Guided Depth Recovery 1216

The feature-guided depth recovery method 1216 is a semi-automated mode suitable for class 1 objects. This method is usually selected when the automated depth recovery method 1220 fails to deliver satisfactory results. However, the method can also be selected directly by the operation mode analyzer 1202. This method differs from the automated depth recovery method 1220 in that object features are selected and tracked with user guidance, instead of automated operations. The input from a user improves the accuracy of feature motion tracking. Typical features selected by a user can be, but are not limited to, corner points, edges and lines, which can easily be identified by a user and reliably tracked by software. More accurate feature points result in more accurate motion models and reduction in motion estimation errors. The subsequent steps of camera motion estimation and depth value computation remain the same as described in the previous section.

Mask-Guided Depth Recovery 1218

The mask-guided depth recovery method 1218 is another semi-automated mode that is suitable for a subset of class 2 objects consisting of a large number of relatively small elements that move towards or away from the camera. Typical examples are a school of swimming fish, floating planktons, water bubbles and flying debris, all being difficult and tedious to model. This method differs from the automated depth recovery method 1220 in that object masks are provided (as a part of step 926) and used as a guide for motion tracking. The object masks can be created by the object mask generation module 902. With object masks available in every frame, each small element is reliably tracked, and its size is measured. In each frame, an element is assigned with a single depth value in each frame calculated based on the size and the motion of the object at the frame interval. A large size element is considered closer to the camera than a smaller element, and a fast moving element is also considered closer to the camera than a slow moving element. The assigned depth values are smoothed by a low-pass filter to achieve temporal consistency.

Bump-Map Depth Modeling 1214

The bump-map depth modeling 1214 is another semi-automated mode that can produce depth maps for a certain types of class 1 objects with complex geometrical details. Examples of such objects are trees, plants, coral reef and rocks with pores, all with complex surface details that are difficult and tedious to model. In this mode, the approximate geometrical shape of such an object is created by a user using simple solid modeling method, and a preliminary depth map is generated from the model. The geometrical details can be added to the preliminary depth map by computing a difference depth map based on color and shading. A bump-map mask is computed from object color and shading, which defines the regions of the object where more depth details are needed. In one embodiment of the present invention, a difference depth map is calculated based on shading so that dark pixels represent deeper depressions while areas with highlights are considered protrusions. In another embodiment of the present invention, a difference depth map is calculated based on color differences. The resulting difference depth map is used to refine the preliminary depth map to produce a more detailed object depth map.

Depth Map Compositing 1222

If an object is processed by more than one method, multiple depth maps are produced. For example, a class 1 object may contain a small region whose motion is independent from camera motion. The depth values in such a region cannot be accurately estimated using automated 1208 or semi-automated 1206 depth recovery methods. In such a case, the small regions may require the use of a different depth modeling mode, such as solid depth modeling 1210. The resulting two depth maps need to be combined because each is accurate only for part of the object.

In general, depth values recovered using automated or semi-automated methods do not match those created by a human operator using a manual method. One stop in depth map compositing 1222 is to scale the depth maps to ensure depth values are consistent. Before scaling, a depth map from an automated or a semi-automated method is converted to a surface by laying a grid mesh on the depth map and identifying key points at the grid lattices that represent abrupt changes in depth values. The resulting mesh surface can be scaled to match the geometry of another depth model. Once all depth models match, different depth maps can be combined into a single depth map based on minimal depth values. The resulting depth maps are referred to as object rough depth maps 1226.

Object Rough Mask Generation 1224

The object rough depth maps 1226 produced from solid depth modeling 1210, generic depth modeling 1212 and bump-map depth modeling 1214 are usually not accurate to match an object boundary. The scope of an object rough depth map is computed and produced as object rough masks 1228. The rough masks are labeled to match the precise object masks of the same object. In one embodiment of the present invention, the rough masks use the same color labeling method as described in FIG. 11. If the depth model encloses the object, the resulting object rough masks 1228 should enclose the precise object masks of the same object.

Object Depth Map Generation 908

Referring again to FIG. 9, one function of the object depth map generation module 908 is to produce accurate object depth maps 916. Object depth maps 916 are computed by refining the object rough depth maps 924 using precise object masks 920 to define object boundary. This process can be achieved by "masking" an object rough depth map 924 using precise object masks 920 of the same object. Because both rough and precise object masks share the same color palette, this process becomes a simple color matching in which every pixel of an object rough depth map is matched to the corresponding object mask. If the color of an object rough mask pixel matches the color of the precise object mask, the depth value of this pixel is kept. If the colors do not march, this pixel is removed from the object rough depth map. If there are any pixel of the precise object mask that cannot find a correspondence from the object rough mask, its depth value is copied or interpolated from the nearest pixels in the depth map that have valid depth values.

If object rough depth maps are available only at key frames, detail object depth maps can be generated for all frames using interpolation. The process can be used when precise object masks are available for all frames. At key frames, detail object depth maps are generated directly from object rough depth maps using the "masking" method. For any in-between frame, a new rough depth map is interpolated from the rough depth maps of adjacent key frames, and then "masked" by the precise object mask of the same frame to produce a new detail object depth map.

Scenes containing dissolves require special treatment. A dissolve scene is a transition between two different shots whereby the first gradually fades out while the second gradually fades in. In the object depth modeling module 904, the two scenes are treated separately, resulting in two object depth map sequences: one defining the depth of the first scene and the other defining the depth of the second scene. For the dissolve portion, those two object depth maps are dissolved into a single depth map for every frame such that the resulting object depth maps are temporally consistent with the before and after scenes. In certain embodiments of the present invention, two different depth dissolving schemes are used. The first scheme is to gradually increase the depth values of both depth map sequences so that both are perceived as moving away from the audience in the first half of the dissolve until they are merged in the distance. In the second half of the dissolve sequence, the depth values are gradually decreased so that scenes are moving forward until it matches the depth of the second scene. The second scheme is to gradually merge the depth maps linearly in the temporal domain.

Object Reconstruction 906

Returning to FIG. 9, when a foreground object occludes a background object, their object masks overlap each other. The foreground object usually determines the color information in overlap regions unless it is a transparent or a reflective object. As a result, part of the background object may have no direct color information. It is possible that the missing part of the background object is revealed in other frames of the sequence when the foreground object moves away. The missing part of the object in an image frame can be reconstructed by tracking the exact motion of the object, registering corresponding features between the current image frame to other frames, and copying corresponding pixels from other frames. With the availability of precise object masks, tracking object motion becomes easier and very reliable. The object reconstruction module 906 fills the missing part of an occluded object with as much information as can be recovered. The process also reduces or completely fills the occlusion regions when objects are computed to new stereoscopic 3D images. For an object that represents image background, the process will reconstruct a "clean plate" or "partially clean plate" if a sufficient number of missing pixels can be recovered from frames.

Object Scaling 910

Objects may need to be scaled to compensate for "miniaturizing" or its reverse phenomenon, discussed in earlier sections. The scaling factor for an object is calculated based on perceived size of the object in a theater that is estimated using depth cues from object depth maps. The scaling factor may vary from frame to frame if the object moves towards or away from the camera in the image shot. Both the precise object masks and object depth map of the same object may be scaled by the same scaling factor.

3D Image Computing 912

The 3D images of an object consist of a left-eye image sequence and a right-eye image sequence of the same object. The left-eye is calculated from the point of view of a left camera, and the right-eye is calculated from the point of view of a right camera. The left and right cameras are virtual camera models that simulate the performance of a real 3D camera. There are a number of virtual camera models that can be selected, from the simplest pinhole camera model to more complex models with multiple focal nodal points and specific lens characteristics. The 3D virtual camera model includes both left and right cameras spaced with a certain inter-ocular distance with a certain camera convergence setting. Certain embodiments of the present invention provide that the default 3D camera model used for 3D motion pictures to be presented at large-format exhibition venues such as IMAX 3D theaters is modeled from a typical IMAX 15/70 3D camera, such as the IMAX 3D camera, with parallel optical axis and an inter-ocular distance of 2.5" in real world coordinates.

Certain embodiments of the present invention does not limit the camera viewing positions with which 3D images are computed. If the original camera position is kept as one of the 3D images, the original object images becomes one of the 3D views. Images computed from any new viewing position inevitably contain undefined regions or otherwise known as occlusion regions. If both left-eye and right-eye images are different from the original camera position, both will contain occlusion regions that need to be filled. The default setting may provide that all layers use the same camera views to compute 3D images for all objects, although different camera views can be used for different layers and even for different objects.

Scene Compositing 414

In the scene compositing 414 stage, in FIG. 4, the left and right images of all objects computed from all layers are combined to form full-frame 3D images based on object depth values. The resulting full-frame 3D images are usually unfinished due to the existence of occlusion regions that need to be filled. Object depth maps from all layers are also combined into full-frame depth maps which describes precise depth values at the scene level. The resulting full-frame depth maps are one of type of IDC that can be saved as RDR. The full depth maps will still be valid if source image data has color changes.

Scene Finishing 416

Figure 13A:
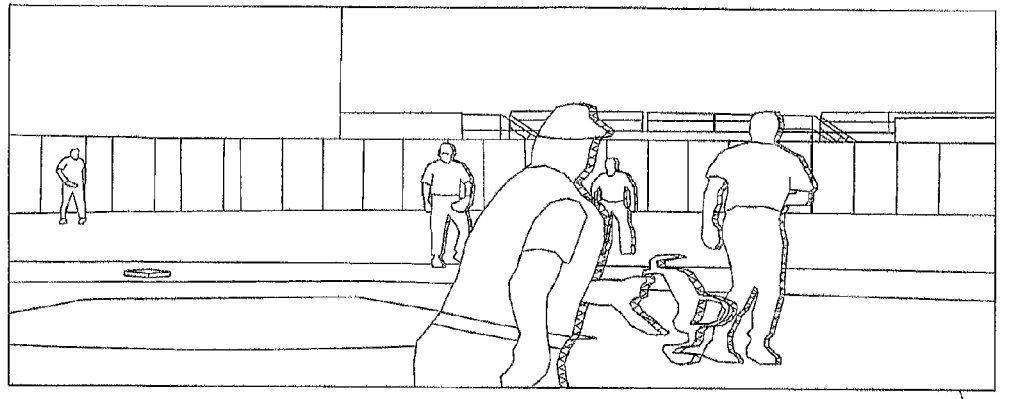
FIG. 13A illustrates a reconstructed right-eye image with unfilled occlusion regions according to one embodiment of the present invention.

Scene finishing 416 is the final stage of some embodiments of the present invention and may be module such as a single processing module. One objective of the scene finishing module 416 is to fill occlusion regions remaining in the newly created 3D images with proper occlusion cues. As a normal practice, the occlusion regions in the 3D images are marked with a distinct color that can easily be identified and extracted as separate occlusion masks. FIG. 13A shows an example of a right-eye image 1302 created with occlusion regions marked with hatches.

Figure 14:
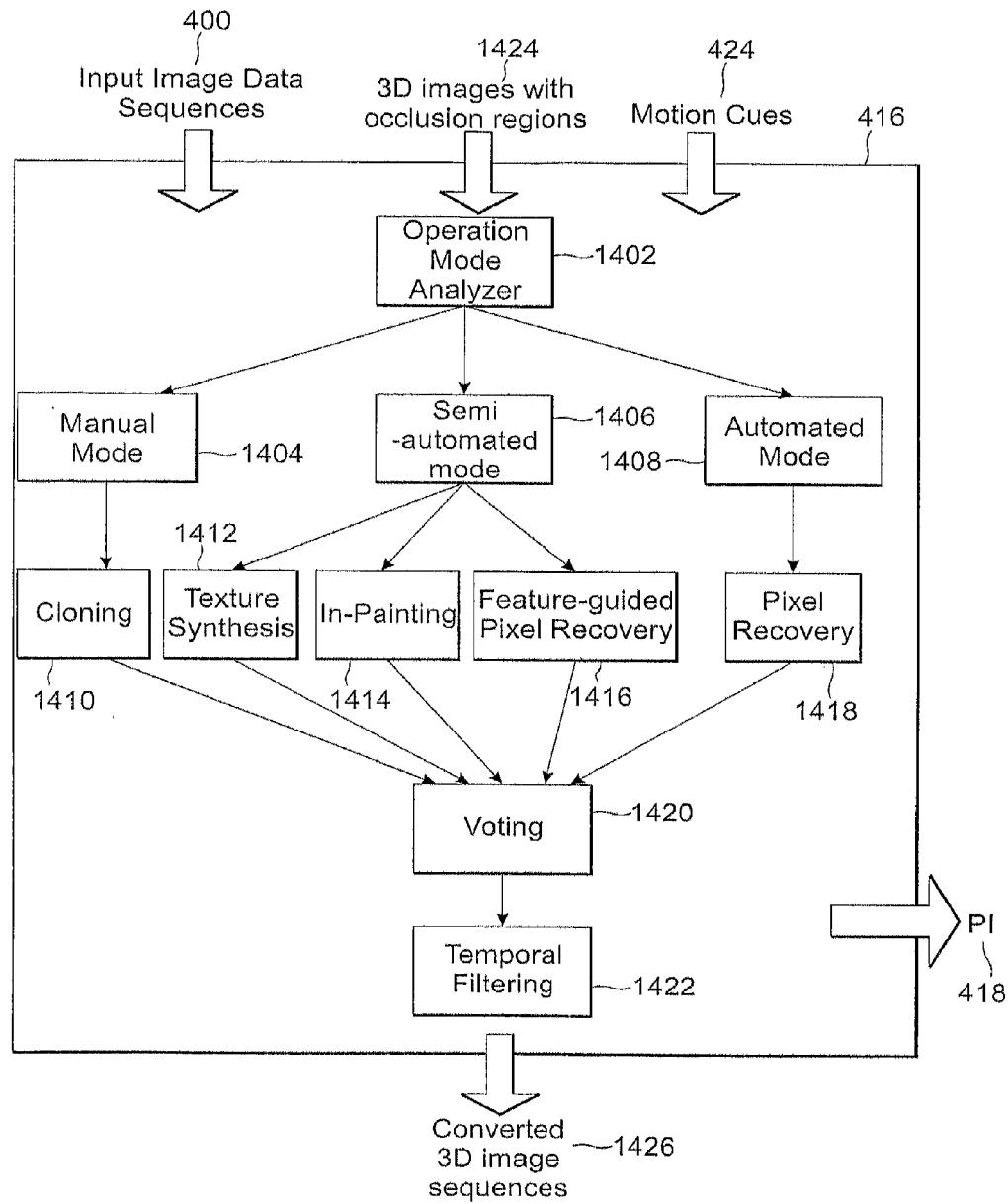
FIG. 14 illustrates a flow diagram of a scene finishing module according to one embodiment of the present invention.

FIG. 14 shows one embodiment of a flow diagram of the scene finishing module 416. It has a multi-mode structure similar to that of the object mask generation module or the object depth modeling module. At least one of input image data sequences 400, 3D images with occlusion regions 1424, and motion cues 424 are received. Similar to the other two modules, an operation mode analyzer 1402 selects appropriate operation methods for each individual occlusion region. Five operational methods are deployed in FIG. 14, including one manual mode 1404, three semi-automated modes 1406, and one automated mode 1408. The manual mode 1404 may include cloning 1410. The semi-automated mode 1406 may include texture synthesis 1412, in-painting 1414, and feature-guided pixel recovery 1416. The automated mode 1408 may include a pixel recovery mode 1418.

Operation Mode Analyzer 1402

The operation mode analyzer 1402 selects a set of appropriate methods for each occlusion region by analyzing the motion and local characteristics of the surrounding region. It can be implemented as a user-guided interactive operation. The operation mode analyzer 1402 selects a set of methods based on the following.

The automated pixel recovery method 1418 relies on the existence of smooth relative motion between foreground and background objects so that pixels that are visible in other frames can be reliably tracked. The feature-guided pixel recovery method 1416 relies on user-guided feature tracking, so that it is less restrictive than the automated mode and can be applied to a broader range of scenes. Both methods may require the availability of motion cues 424.

Both the texture synthesis method 1412 and the in-painting method 1414 generate "fake" pixels by synthesizing the properties of neighborhood pixels. They are most suitable for those occlusion regions with absolutely no information. Each method is more suitable for a certain types of occlusion regions. For example, texture synthesis 1412 may work better for occlusion regions surrounded by organic texture, while the in-painting method 1414 may be more suitable for occlusion regions surrounded by more structured texture.

Cloning 1410 is a manual method for filling occlusion regions where other methods fail to produce satisfactory results, usually for small occlusion regions.

The operation mode analyzer 1402 may select more than one method for an occlusion region. In that case, the multiple results are evaluated through a voting process in block 1420 and the best result is temporal filtered in bock 1422 and the output is converted 3D image sequences 1426.

Pixel Recovery 1418

The pixel recovery method 1418 may use similar methods as the object reconstruction 906 except that it works on the scene level with full-frame 3D images. This method is used when occlusion regions can be filled with information revealed from other frames. A search is performed for missing pixels from the frames and the missing frames are copied to a target frame to fill the occlusion region. The number of frames to be searched is considered as a temporal window, and the length of the temporal window increases as the object motion slows down. The matching pixels are analyzed and may be scaled or even warped to match the scale change caused by motion. The scaling factor and/or the warping transforms are determined by a feature tracking method that was disclosed in automated depth recovery. The scaled and/or warped pixels are then copied to the target frame. This process may be repeated for all pixels in an occlusion region in every frame.

Feature-Guided Pixel Recovery 1416

This method can be similar to automated pixel recovery 1418 except feature tracking can be guided by a trained user, similar to the method used in the feature-guided depth recovery. The features are used for two purposes: (1) to guide the search for matching pixels; and (2) to determine the scaling and warping transforms. The remaining steps in the method may be identical to the automated pixel recovery method 1418.

Texture Synthesis 1412

If an occlusion region can not find the matching pixels from other frames, the missing pixels can only be synthesized based on the properties of local neighborhood pixels. Simple methods such as duplicating or mirroring adjacent pixels usually result in unacceptable visual artifacts. Texture synthesis 1412 is an approach for synthesizing a new image that looks indistinguishable to a given texture sample. The detailed methods of texture synthesis 1412 are well known to those skilled in the art. The present invention discloses that the methods of texture synthesis 1412 are used to synthesize the texture of regions surrounding an occlusion region in order to fill the occlusion region, resulting no visible artifacts. The set of texture samples, called patches, can be selected by a user near the occlusion region. The user can also adjust parameters of a texture synthesis algorithm in order to achieve desirable results. This method works well for regions with natural texture such as trees, leaves and for repetitive textures.

Certain embodiments of the present invention also includes a method of maintaining both spatial and temporal consistency of synthesized texture results. To achieve this, an energy function is defined that includes terms to measure local spatial smoothness of each patch with its neighbor areas including the edge pixels around the occlusion borders. The energy function also includes terms to measure temporal smoothness between the current frame and the neighbor frames for each texture patch. The energy function is then minimized to generate the optimal synthesized texture resulting from a combination of synthesized texture patches. This energy function based texture synthesis method improves both spatial and temporal smoothness of synthesized pixels.

In-Painting 1414

In-painting 1414 is an alternative method of producing synthesized pixels for missing image regions. It may be particularly suitable for local regions with definite structures. The method is based on the propagating pixel information from the outside regions of an occlusion region. In-painting 1414 extends the structures of outside regions to the interior of the occlusion region based on partial differential equations analysis of local edges and structures. The methods of in-painting 1414 can be used to fill occlusion regions of certain images. A semi-automated implementation of the in-painting method 1414 may be used to maintain temporal consistency. In this method, the occlusion region collected from multiple frames is treated as a volumetric data, and so are the collected regions surrounding the occlusion region. With a GUI environment, a user defines extension of the structure of outside regions into an occlusion region by drawing some connecting lines and curves for every frame. The iterations are finished until all pixels in the regions are filled. By treating images as volumetric data, the temporal consistency can be maintained.

Cloning 1410

The functions of cloning 1410 and brush painting are provided in most graphical processing software tools. Cloning 1410 may be used instead of brush painting because brush painting is not color-independent. In cloning 1410, pixels to be copied to an occlusion region are selected from other parts of the images. Because cloning can be saved as a vector form in a render script, it can be repeated regardless of source image data color changes.

Voting 1420

Figure 13B:
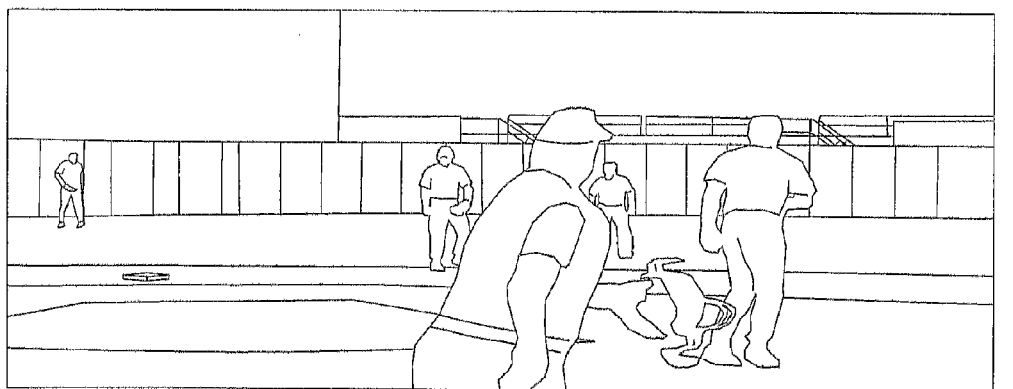
FIG. 13B illustrates a finished right-eye image of FIG. 13A with occlusion regions filled according to one embodiment of the present invention.

The color information used to fill occlusion regions is referred to as occlusion cues which can be saved as part of RDR. When occlusion cues are created by more than one method, the best result is selected based on certain criteria. One criterion is to maintain temporal consistency, followed by spatial smoothness. This process may be performed by visual inspection by a human operator. FIG. 13B shows an example of finished right-eye image 1304 with occlusion regions filled with proper information.

Temporal Filtering 1422

Temporal filtering 1422 is the last step to further reduce temporal inconsistency of the filled occlusion regions. The temporal filter may be similar to those deployed for the temporal analysis and enhancement stage 402. Applying temporal filtering can improve the quality of the resulting converted 3D image sequences 1426.

General

The foregoing description of embodiments of the invention has been presented only for the purpose of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments with various modifications as are suited to the particular use contemplated. For example, the principles of this invention can be applied to any graphics conversion process whether it be 2D to 3D conversion, or frame rate conversion, or image warping conversion, or any other conversion that contributes to image enhancement or a conversion which facilitates further image enhancement within a projector to produce the enhanced images.

What is claimed is:

1. A method for converting a 2D image data sequence into a 3D image data sequence, the method comprising:
receiving the 2D image data sequence;
performing a temporal analysis on the 2D image data sequence to determine image motion cues;
dividing the 2D image data sequence into scenes, each scene comprising at least one object, wherein the scenes are grouped;
identifying objects in each scene and determining characteristics associated with each object, wherein the characteristics comprise a geometrical position and shape;
determining whether each scene is suitable for automated processing based on scene classification;
assigning each object to an object layer based on the characteristics associated with each object;
generating a depth map for each object based on the object layer;
collecting processing information associated with each object;
generating converted object images using the processing information;
storing the processing information into a render data record;
combining the converted object images to produce a 3D scene;
combining depth maps into full frame depth maps;
filling occlusion regions in the converted 3D scene;
generating a 3D image sequence using the full frame depth maps and 3D scene;
outputting the converted 3D image and render data record.

2. The method of claim 1, wherein generating the depth map for each object based on the object layer comprises:
data;
implementing a virtual camera by receiving camera parameters;
identifying an object in a selected image frame;
receiving an estimated dimension for the object;
creating a model of the object based on the estimated dimension;
positioning the model of the object at a first selected distance from a virtual camera position;
computing an image of the model of the object from a virtual camera view point;
comparing a size of the model of the object in the image to a size of the object in the selected image frame;
positioning the model of the object at a second selected distance from the virtual camera position and computing a second image of the model of the object until the size of the model of the object in the second image matches the size of the object in the selected image frame; and
estimating a real-world position of the object based on the first and second selected distances of the model of the object for computing the depth of the object.

3. The method of claim 2, wherein estimating real-world positions of objects is performed for multiple image frames.

4. The method of claim 1, further comprising:
enhancing the 2D image data sequence before dividing the 2D image data sequence.

5. The method of claim 1, further comprising:
generating a left eye image data sequence and a right eye image data sequence using the 2D original image data sequence, wherein the left and right eye image data sequences form a stereoscopic 3D view.

6. The method of claim 5, where the original 2D image data sequence is used as the left or right image data sequence.

7. The method of claim 1, wherein the data render records comprise data associated with processing the 2D original image sequence and generating the 3D image sequence, the associated data comprising:
processing information;
editorial information;
computing instructions and parameters.

8. The method of claim 4, wherein performing a temporal analysis on the 2D image data sequence to determine image motion cues provides motion information to facilitate processing; and
wherein enhancing the 2D image data sequence before dividing the 2D image data sequence provides enhancement information to facilitate processing in downstream stages.

9. The method of claim 1, wherein dividing the 2D image data sequence into scenes comprises creating a shot list with shot group information.

10. The method of claim 1, wherein identifying objects in each scene and determining characteristics associated with each object, further comprising:
characterizing the geometrical position using match by scaling.

11. The method of claim 1, wherein determining whether each scene is suitable for automated processing is based on at least one of motion field and depth of field.

12. The method of claim 1, wherein assigning each object to the object layer based on characteristics associated with each object further comprises:
assigning each object to different layers.

13. The method of claim 12, further comprising:
associating a label to each object, wherein the label identifies the assigned layer for the associated object.

14. The method of claim 13, wherein the label is a color selected from a predefined color palette.

15. The method of claim 12, wherein assigning each object to different layers is based on a criteria, the criteria comprising at least one of:
object transparent;
reconstruction of objects with occlusion;
automated object separation;
description of particle objects;
object size compensation; and
motion classification.

16. The method of claim 15, wherein object transparency comprises:
using transparency for at least one pixel in an object;
corresponding multiple pixel and depth values to different objects; and
wherein the different objects are assigned to different layers.

17. The method of claim 1, wherein collecting processing information associated with each object and generating converted object images using the processing information comprises:
object mask generation;
object depth modeling;
object re-construction;
object depth map generation;
object scaling; and
computing at least one stereoscopic image.

18. The method of claim 17, wherein object re-construction comprises:
detecting missing object information; and
reconstructing the missing object information in a layer independent of other layers.

19. The method of claim 17, wherein object scaling comprises:
compensating for miniaturization or reverse miniaturization.

20. The method of claim 17, wherein object mask generation comprises:
analyzing the 2D image data sequence, layer information, and motion cues associated with the 2D image data sequence;
selecting an operating mode, wherein the operating mode is selected from the group consisting of:
automated;
semi-automated; and
manual;
wherein each operating mode comprises at least one sub-process; and
generating an object mask using one or more sub-processes.

21. The method of claim 20, wherein the automated operating mode comprises a shape recovery sub-process.

22. The method of claim 20, wherein the semi-automated operating mode comprises:
color-based separation sub-process; and
graph-cut based separation sub-process.

23. The method of claim 20, wherein generating the object mask further comprises:
generating a mask at selected frames; and
interpolating the mask for all frames in a sequence based on motion tracking.

24. The method of claim 17, wherein object depth modeling comprises:
analyzing the 2D image data sequence, layer information, and motion cues associated with the 2D image data sequence;
selecting an operating mode, wherein the operating mode is selected from the group consisting of:
automated;
semi-automated; and
manual; and
generating a rough object depth map and rough object mask using at least one sub-process.

25. The method of claim 24, wherein the automated operating mode comprises:
an automated depth recovery sub-process; and
wherein the automated depth recovery sub-process comprises calculating a depth value by:
detecting camera motion; and
obtaining camera motion using the pixel motion and temporal filtering.

26. The method of claim 24, wherein the semi-automated operation mode comprises:
a bump-map depth modeling sub-process comprising:
defining a best fit approximate geometrical shape of the object; and
automatically adding object details based on the best fit, color and shading;
a feature-guided depth recovery sub-process comprising:
calculating a depth value by detecting camera motion and obtaining camera motion from pixel motion; and
wherein detecting camera motion is adapted to be at least partially controlled by a user; and
a mask-guided depth recovery sub-process comprising:
tracking an object mask to obtain object size and motion, wherein the tracking is adapted to be at least partially guided by a user; and
calculating depth values based on object size and motion.

27. The method of claim 24, wherein the manual operation mode comprises a solid depth modeling sub-process, wherein the model follows object motion and does not require full object detail or fit in the object boundary.

28. The method of claim 24, further comprising:
using a plurality of sub-processes to generate the rough object depth map and rough object mask;
scaling and combining the results of each sub-process to produce the object depth model.

29. The method of claim 24, further comprising:
refining the rough object depth mask to produce a depth map.

30. The method of claim 29, further comprising:
generating depth maps for at least two scenes; and
merging the depth maps for the at least two scenes by depth dissolving.

31. The method of claim 17, wherein object re-construction comprises:
detecting missing information in an object; and filling missing information by:
tracking object motion to determine corresponding features in other frames;
registering the corresponding features; and
copying corresponding pixels from the other frames.

32. The method of claim 1, wherein combining depth maps into full frame depth maps further comprises:
combining all object depth maps from all layers to create a full frame depth map; and
combining 3D scenes into full frame 3D images with occlusion regions.

33. The method of claim 1, wherein filling occlusion regions in the converted 3D scene comprises:
analyzing 3D images with occlusion regions, the 2D image data sequence, and motion cues;
selecting an operating mode, wherein the operating mode is selected from the group consisting of:
automated;
semi-automated; and
manual;
wherein each operating mode comprises at least one sub-process;
filling occlusion regions using at least one sub-process; and
temporally filtering the filled occlusion regions to produce the converted 3D image sequence.

34. The method of claim 33, wherein the automated operating mode comprises a pixel recovery sub-process, the pixel recovery sub-process comprising:
tracking warped pixels in other frames; and
copying the tracked pixels.

35. The method of claim 33, wherein the semi-automated operating mode comprises:
a feature-guided pixel recovery sub-process comprising:
filling occlusion regions by copying tracked and warped pixels; and
wherein filling occlusion regions is adapted to receive user input;
a texture synthesis sub-process comprising:
synthesizing a texture of regions surrounding each region of occlusion; and
an in-painting sub-process;
propagating pixel information collected from outside occlusion regions over multiple frames.

36. The method of claim 33, further comprising:
filling occlusion regions using a plurality of sub-processes to produce a plurality of scenes having filled occlusion regions; and
selecting the scene using a voting process, wherein the voting process is based on temporal consistency and spatial smoothness.

37. A system, comprising:
a front-end system comprising an open platform adapted to:
accommodate commercial software providing render scripting capability;
provide at least one of parallel and distributed computing; and
allow for human interaction; and
a backend system adapted to:
manage converting a 2D image data sequence into a 3D image data sequence by:
receiving the 2D image data sequence;
performing a temporal analysis on the 2D image data sequence to determine image motion cues;
dividing the 2D image data sequence into scenes, each scene comprising at least one object, wherein the scenes are grouped;
identifying objects in each scene and determining characteristics associated with each object, wherein the characteristics comprise a geometrical position and shape;
determining whether each scene is suitable for automated processing based on scene classification;
assigning each object to an object layer based on the characteristics associated with each object;
generating a depth map for each object based on the object layer;
collecting processing information associated with each object;
generating converted object images using the processing information;
storing the processing information into a render data record;
combining the converted object images to produce a 3D scene;
combining depth maps into full frame depth maps;
filling occlusion regions in the converted 3D scene;
generating a 3D image sequence using the full frame depth maps and 3D scene;
outputting the converted 3D image and render data record;
perform automated functions; and
perform central database functions.

38. The system of claim 37, wherein the front-end system further comprises:
work station terminals having a graphical user interface, wherein the number of work station terminals is scalable;
a front-end system network switch adapted to interface with a backend system network switch;
a pre-render adapted to provide the parallel and distributed computing; and
a verification server adapted to output the verified converted image data sequence.

39. The system of claim 38, wherein the front-end further comprises a display area for allowing a converted 3D image sequence to be examined.

40. The system of claim 37, wherein the backend system further comprises:
an intelligent controller server adapted to manage image sequence conversion processing;
a central data storage;
a data input/output device adapted to receive the 2D image data sequence;
a backend system network switch adapted to interface with a front-end system network switch;
one or more render cluster processors adapted to perform automated processes, wherein the number of render cluster processors is scalable; and
a user controls interface adapted to allow users to monitor the image sequence conversion process.

* * * * *

UNITED STATES PATENT AND TRADEMARK OFFICE
CERTIFICATE OF CORRECTION

PATENT NO. : 8,411,931 B2  
APPLICATION NO. : 12/299909  
DATED : April 2, 2013  
INVENTOR(S) : Samuel Zhou, Paul Judkins and Ping Ye Page 1 of 2

Figure 7:
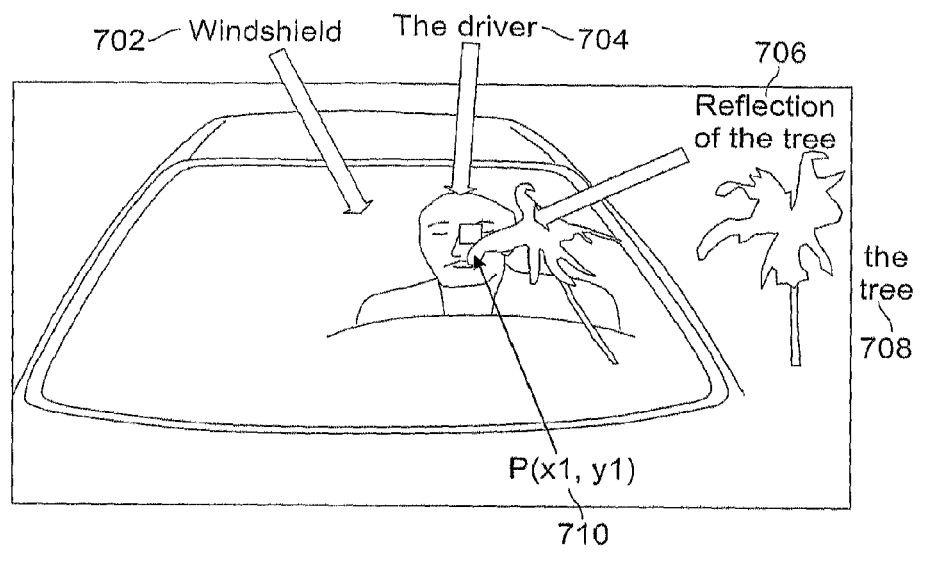
FIG. 7A illustrates a first transparent object according to one embodiment of the present invention.
FIG. 7B illustrates a second transparent object according to one embodiment of the present invention.
Figure 7:
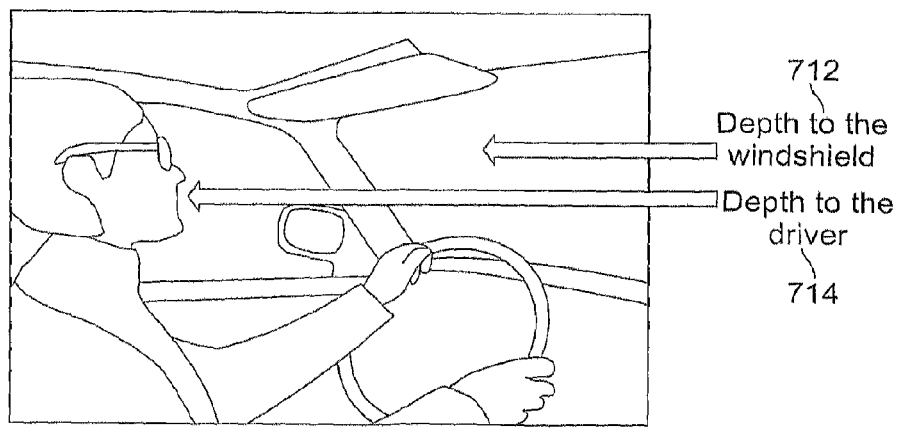

It is certified that error appears in the above-identified patent and that said Letters Patent is hereby corrected as shown below:

In the Drawings, Sheet 7, change FIG. 7 to --FIG. 7A--.

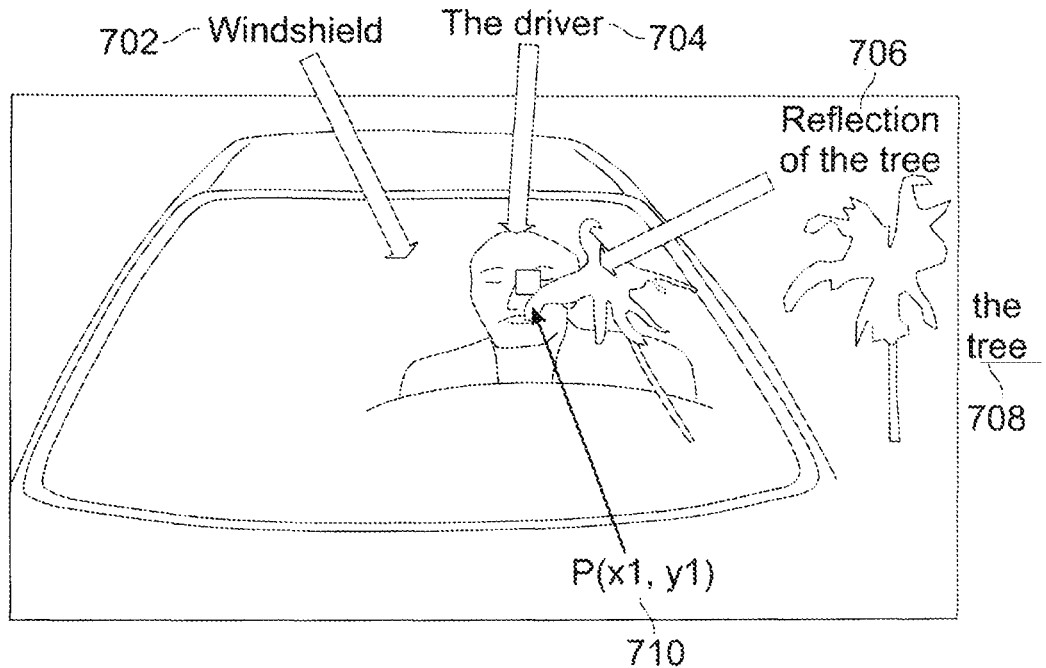

FIG 7A

Signed and Sealed this  
Sixteenth Day of July, 2013

Teresa Stanek Rea  
*Acting Director of the United States Patent and Trademark Office*

CERTIFICATE OF CORRECTION (continued)
U.S. Pat. No. 8,411,931 B2

In the Drawings, Sheet 7, change FIG. 7 to --FIG. 7B--.

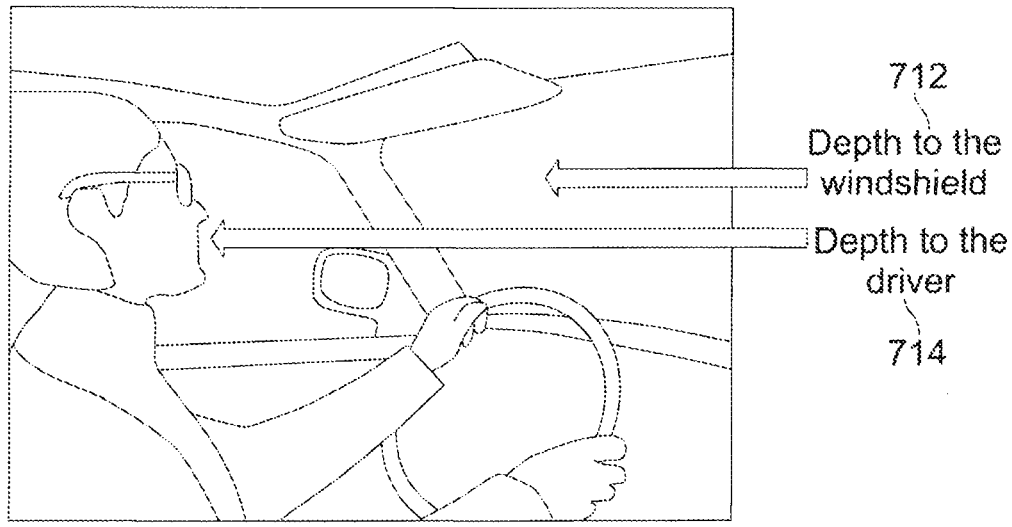

FIG 7B